US012137089B2

(12) United States Patent
Dunjic et al.

(10) Patent No.: US 12,137,089 B2
(45) Date of Patent: *Nov. 5, 2024

(54) MANAGING THIRD-PARTY ACCESS TO CONFIDENTIAL DATA USING DYNAMICALLY GENERATED APPLICATION-SPECIFIC CREDENTIALS

(71) Applicant: The Toronto-Dominion Bank, Toronto (CA)

(72) Inventors: Milos Dunjic, Oakville (CA); Arthur Carroll Chow, Markham (CA); David Samuel Tax, Toronto (CA); Armon Rouhani, Toronto (CA); Keith Sanjay Ajmani, Toronto (CA); Gregory Albert Kliewer, Barrie (CA); Anthony Haituyen Nguyen, Toronto (CA); Martin Albert Lozon, London (CA); Kareem El-Onsi, Toronto (CA); Ashkan Alavi-Harati, Markham (CA); Arun Victor Jagga, Mississauga (CA)

(73) Assignee: The Toronto-Dominion Bank, Toronto (CA)

( * ) Notice: Subject to any disclaimer, the term of this patent is extended or adjusted under 35 U.S.C. 154(b) by 111 days.

This patent is subject to a terminal disclaimer.

(21) Appl. No.: 17/738,816

(22) Filed: May 6, 2022

(65) Prior Publication Data
US 2022/0263814 A1    Aug. 18, 2022

Related U.S. Application Data

(63) Continuation of application No. 16/561,645, filed on Sep. 5, 2019, now Pat. No. 11,368,444.

(51) Int. Cl.
*H04L 29/06* (2006.01)
*H04L 9/40* (2022.01)
(Continued)

(52) U.S. Cl.
CPC ...... *H04L 63/0807* (2013.01); *H04L 63/0428* (2013.01); *H04L 63/062* (2013.01);
(Continued)

(58) Field of Classification Search
CPC .................................................. H04L 63/0807
See application file for complete search history.

(56) References Cited

U.S. PATENT DOCUMENTS 8,595,494 B2    11/2013    Monjas et al.
8,782,411 B2    7/2014    Nimashakavi et al.
(Continued)

FOREIGN PATENT DOCUMENTS

CA    3041617    11/2019
CN    103441857 A    4/1990
CN    103220261 B    5/2016

OTHER PUBLICATIONS

Hovsmit, "Strengthening OAuth2 for Mobile," Software Performance and API Security, https://hackemoon.com/strengthening-oauth2-for-mobile-f413925dbf18.
(Continued)

*Primary Examiner* — Bradley W Holder
(74) *Attorney, Agent, or Firm* — Duane Morris LLP

(57) ABSTRACT

The disclosed exemplary embodiments include computer-implemented systems, apparatuses, and processes that dynamically manage consent, permissioning, and trust between computing systems and unrelated, third-party applications operating within a computing environment. By way of example, the apparatus may receive a request for an element of data that includes an access token and first credential data associated with an application program. When the first credential data corresponds to second credential data associated with the application program, may determine that the requested data element is accessible to the
(Continued)

application program and perform operations that validate the access token. Further, and based on the validation of the access token, that apparatus may obtain and encrypt the requested data element, and may transmit the encrypted data element to a device via the communications interface.

20 Claims, 11 Drawing Sheets

(51) Int. Cl.
*H04W 12/0433* (2021.01)
*H04W 12/082* (2021.01)

(52) U.S. Cl.
CPC ...... *H04L 63/0815* (2013.01); *H04L 63/0823* (2013.01); *H04L 63/0853* (2013.01); *H04L 63/0884* (2013.01); *H04W 12/0433* (2021.01); *H04W 12/082* (2021.01)

(56) References Cited

U.S. PATENT DOCUMENTS

| | | | |
|---|---|---|---|
| 8,935,757 B2 | 1/2015 | Srinivasan et al. | |
| 8,959,347 B2 | 2/2015 | Gupta et al. | |
| 8,931,081 B2 | 6/2015 | Celi, Jr. et al. | |
| 9,118,648 B2 | 8/2015 | Gonzalez et al. | |
| 9,118,653 B2 | 8/2015 | Nimashakavi et al. | |
| 9,165,134 B2 | 10/2015 | Lorenzo et al. | |
| 9,306,939 B2 | 4/2016 | Chan et al. | |
| 9,552,444 B2 | 1/2017 | Smith et al. | |
| 9,537,864 B2 | 3/2017 | Templin et al. | |
| 9,858,407 B2 | 2/2018 | Caron et al. | |
| 11,132,660 B2* | 9/2021 | Sidhu | G06Q 20/223 |
| 2002/0199097 A1* | 12/2002 | Narita | G06Q 20/383 |
| | | | 713/153 |
| 2005/0154889 A1* | 7/2005 | Ashley | H04L 9/3234 |
| | | | 713/171 |
| 2012/0254972 A1 | 4/2012 | Fulton | |
| 2014/0090036 A1 | 3/2014 | Roberts et al. | |
| 2014/0189799 A1* | 7/2014 | Lu | H04L 63/102 |
| | | | 726/4 |
| 2014/0331060 A1 | 11/2014 | Hayton | |
| 2015/0271146 A1 | 9/2015 | Holyfield et al. | |
| 2018/0115551 A1* | 4/2018 | Cole | H04L 47/783 |
| 2019/0380020 A1* | 12/2019 | Pellegrini | H04W 4/90 |

OTHER PUBLICATIONS

Barnes, et al., "The OAuth Security Model for Delegated Authorization," Jul. 2009, https://tools.ietf.org/id/draft-bames-oauth-model-01.html.

"Understanding How Access Manager Uses OAuth and OpenID Connect," Micro Focus, https://www.netiq.com/documentation/access-manager-44/admin/data/b1dj6b2f.html.

Maheswaran, "Building Privacy-Preserving Cryptographic Credentials from Federated Online Identities," Yale University, ProQuest Dissertations Publishing, 2016, https://search.proquest.com/docview/1765227875/fulltextPDF/9C4B5D7421374DCOPQ/3?accountid=142944.

* cited by examiner

MANAGING THIRD-PARTY ACCESS TO CONFIDENTIAL DATA USING DYNAMICALLY GENERATED APPLICATION-SPECIFIC CREDENTIALS

CROSS-REFERENCE TO RELATED APPLICATION

This application is a continuation of, and claims the benefit of priority to, U.S. application Ser. No. 16/561,645, filed Sep. 5, 2019, the disclosure of which is expressly incorporated herein by reference to its entirety.

TECHNICAL FIELD

The disclosed embodiments generally relate to computer-implemented systems and processes that manage third-party access to confidential data maintained within a computing environment using dynamically generated, and adaptively modified, application-specific credentials.

BACKGROUND

Many computing environments include multiple, network-connected devices and systems that maintain, access, or distribute confidential data across various communications networks. For example, in an open banking environment, these computing systems may maintain programmatic interfaces capable of establishing communications, and exchanging data, with third-party applications executed by additional network-connected devices and systems. In some instances, one or more of these third-party applications may access elements of confidential data maintained on behalf of a customer by computing systems of one or more financial institutions, and may perform operations to process, aggregate, or display portions of the confidential data on a digital interface, e.g., via the customer's mobile device, or that distribute portions of the obtained customer and account data to other devices and systems operating within the computing environment.

SUMMARY

In some examples, an apparatus, includes a communications interface, a memory storing instructions, and at least one processor coupled to the communications interface and the memory. The at least one processor is configured to execute the instructions to receive, via the communications interface, a first request for an element of data. The first request includes an access token and first credential data associated with an application program. The at least one processor is also configured to execute the instructions to, when the first credential data corresponds to second credential data associated with the application program, determine that the requested data element is accessible to the application program and perform operations that validate the access token. Based on the validation of the access token, the at least one processor is configured to execute the instructions to obtain and encrypt the requested data element, and to transmit the encrypted data element to a device via the communications interface.

In other example, a computer-implemented method includes receiving, using at least one processor, a first request for an element of data. The first request includes an access token and first credential data associated with an application program. When the first credential data corresponds to second credential data associated with the application program, the computer-implemented method also includes determining, using the at least one processor, that the requested data element is accessible to the application program and performing, using the at least one processor, operations that validate the access token. The computer-implemented method includes, based on the validation of the access token, obtaining and encrypting the requested data element using the at least one processor, and using the at least one processor, transmitting the encrypted data element to a device.

Further, in some examples, a tangible, non-transitory computer-readable medium stores instructions that, when executed by at least one processor, cause the at least one processor to perform a method that includes receiving a first request for an element of data. The first request includes an access token and first credential data associated with an application program. When the first credential data corresponds to second credential data associated with the application program, the method includes determining that the requested data element is accessible to the application program and performing operations that validate the access token. Based on the validation of the access token, the method includes obtaining and encrypting the requested data element, and transmitting the encrypted data element to a device via a communications interface.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

BRIEF DESCRIPTION OF THE DRAWINGS

Like reference numbers and designations in the various drawings indicate like elements.

DETAILED DESCRIPTION

Figure 1:
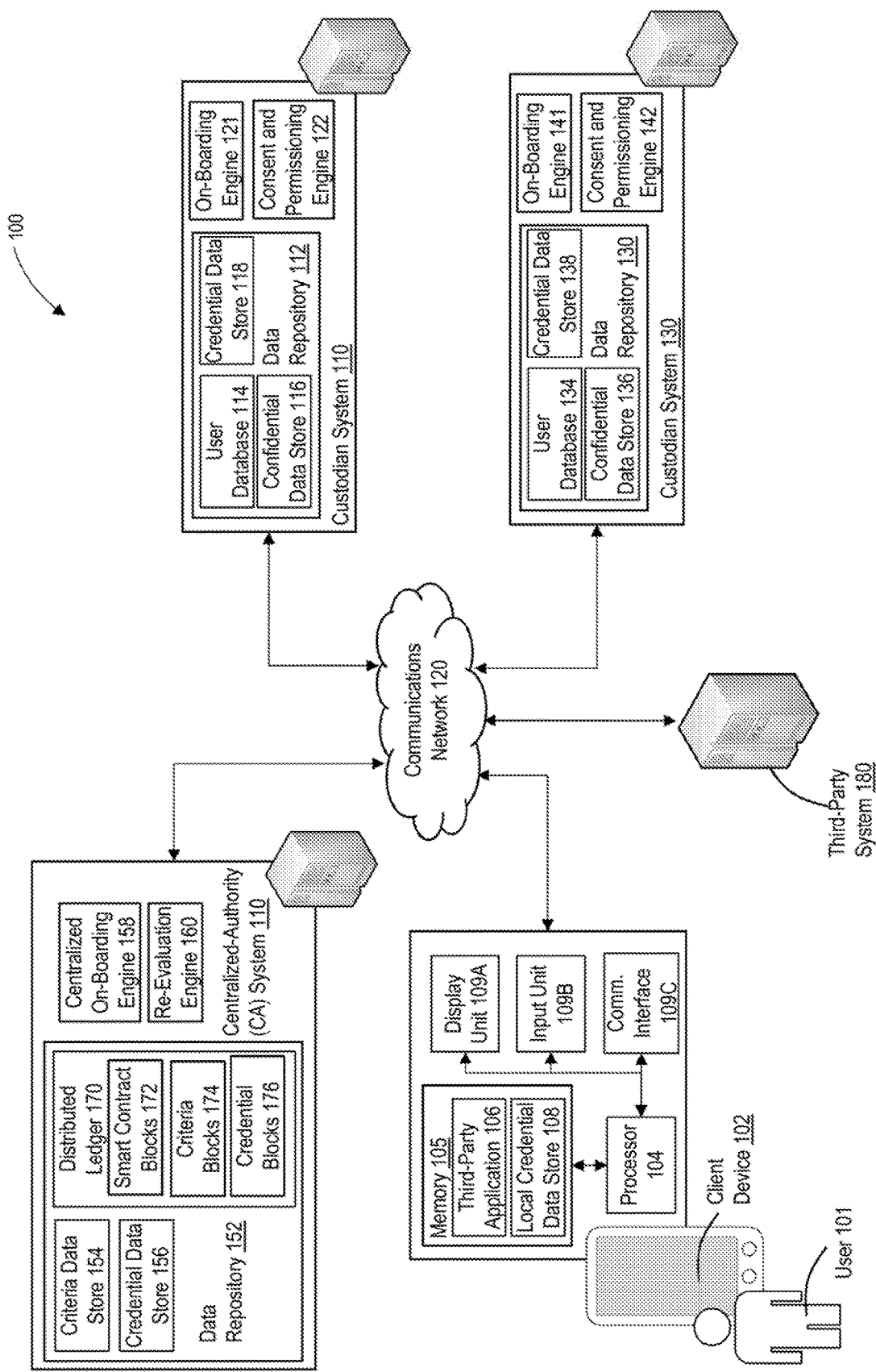
FIG. 1 is a block diagram of an exemplary computing environment, in accordance with some embodiments.

This specification relates to computer-implemented processes that, among other things, dynamically manage consent, permissioning, and trust between computing systems and unrelated, third-party applications operating within a computing environment. For example, the computing environment may include one or more network-connected computing systems (e.g., "custodian" systems) that maintain elements of confidential data on behalf of one or more users. The computing environment may also include one or more network-connected computing systems operated by third-parties unrelated to the custodian systems, e.g., "third-party" systems, which may perform operations that provision one or more executable applications (e.g., a "third-party" application) to other computing devices or systems operating within environment 100. For example, a third-party system operating within the computing environment may provision a third-party application, such as a financial management application or a financial aggregation application, to a computing device (e.g., a "client" device) operated by a customer of one or more financial institutions.

When executed by the client device, the third-party application may perform operations that request access to the elements of the confidential data maintained on behalf of the customer at one or more of the custodian systems. Further, and upon receipt of the requested elements of confidential data at the client device, the executed third-party application may perform operations that, among other things, process or aggregate the received elements of confidential data for presentation within a digital interface, store the received, processed, or aggregated elements of confidential data within a local data repository, or distribute the received, processed, or aggregated elements of confidential data to other computing systems operating within the computing environment.

As described herein, and to ensure that the access requested by the third-party application comports with a level or type of access granted to the third-party system by the user, the client device and the one or more custodian systems may perform operations that collectively implement a token-based authentication and consent process, such as an OAuth protocol. By way of example, and to access the elements of confidential data maintained on behalf of the user at a corresponding one of the custodian systems, the client device may transmit a request that includes data identifying the user, the third-party application or system, and the requested access (e.g., the requested elements of confidential data) across a communications network to a secure, programmatic interface established and maintained by the corresponding custodian system, e.g., to a network address of an application programming interface (API).

In some instances, and in response to the received request, the corresponding custodian system may establish a direct communications channel with the client device, and may transmit a notification to the client device that, when presented within a digital interface, identifies the access requested by the third-party application and prompts the user to consent to the requested access by providing one or more authentication credentials as inputs to the digital interface. Based on a successful authentication of the user's identity, and based on the user's consent to the requested access, the corresponding custodian system may generate a digital token, cryptogram, hash value, or other element of cryptographic data, such as an OAuth token, indicative of the successful authentication and of the user's consent to the requested access, and may store the OAuth token within a tangible, non-transitory memory in conjunction with the data identifying the third-party application. The corresponding custodian system may also transmit the OAuth token across the communication network to the client device for storage within a tangible, non-transitory memory accessible to the third-party application.

In some instances, the executed third-party application may perform operations that request to access elements of confidential data maintained on behalf of the user at the corresponding custodian system. For example, and upon a successful authentication of the user's identity, the executed third-party application may package the OAuth token into a request for the elements of confidential data, and may transmit the request to the corresponding custodian system across the communications network. Based on a verification of the OAuth token, the corresponding custodian system may provision the requested elements of confidential data to the client device, e.g., for further processing in accordance with the user's granted consent.

While the implementation of these existing token-based authorization and consent processes enables the executed third-party application to access the requested elements of confidential data in accordance with the user's established consent, and without revealing the user's authentication credentials across insecure communications channels, these processes (e.g., the OAuth protocol described herein) provide no mechanism to ensure that the third-party application's use, management, or distribution of the accessed elements of confidential data comports with the established consent or with any conditions imposed by the corresponding custodian system. Further, through certain of these existing the token-based authorization and consent processes, including the OAuth protocol described herein, the user authorization and consent, which enables the third-party application's access of the confidential data, is decoupled from any improper use of that accessed confidential data by third-party application, such as a dissemination of the access data to unauthorized parties or applications.

In some exemplary embodiments, as described herein, a computing system associated with a centralized authority (e.g., a CA computing system) may perform operations that, based on data characterizing a third-party application, generate a reliable and cryptographically secure indicator (e.g., an "application-specific credential") of a likelihood that the third-party application will manage requested elements of confidential data not only in accordance with a level of access granted by the user, but also in accordance with one or more limitations imposed on the management of the confidential data by one or more custodian systems operating within a computing environment (e.g., an "application-specific credential"). The CA computing system may, in some examples, perform additional operations that provision the application-specific credential to each of the network-connected devices or systems that execute the third-party application, and may perform further operations that record the application-specific credential within the ledger blocks of a cryptographically secure distributed ledger accessible to the one or more custodian systems, thus establishing an initial portion of an immutable, time-evolving record indicating the use, or misuse, of elements of confidential data by the third-party application.

In further instances, as described herein, a subsequent use of the accessed elements of confidential data by the third-party application may exceed, or violate, either inadvertently or by deliberate action, the level of access previously granted the third-party application by the particular user and additionally, or alternatively, the limitations imposed by the one or more custodian systems. In other instances, a standing of a third-party entity associated with the third-party application before a governmental, regulatory, or judicial body (e.g., the corporate registration of the company may lapse, the company may owe back taxes, the company may be subject to one or more judicial orders or liens, etc.) may be indicative of a lack of trustworthiness of that third-party entity and as such, an increase in the likelihood that the third-party application with mismanage the accessed elements of confidential data.

Based on the subsequent use of the accessed elements of confidential data by the third-party application, or the governmental, regulatory, or judicial standing of the entity associated with the third-party application, the CA system may perform operations that modify, or that revoke, an ability of the third-party application to access the confidential data maintained by the one or more custodian systems. In some instances, the CA computing system may perform any of the exemplary processes described herein to record, within additional ledger blocks, data indicative of the modified or revoked ability of the third-party application to access the elements of confidential data, and an updated version of the distributed ledger, which includes the additional ledger blocks, may be broadcast to each of the one or more custodian systems.

Further, and as described herein, the executed third-party application may perform operations that generate an additional request for the elements of confidential data maintained at the corresponding custodian system that, in additional to the OAuth token described herein, also includes the application-specific credential generated by the CA system. The particular corresponding system may receive the request, and may perform operations the provision the requested elements of confidential data to the third-party application based on a validation of both the OAuth token (e.g., based on a reference OAuth token maintained locally for the third-party application) and the access-specific credential (e.g., based on a reference credential and data indicative of a modification or revocation of a previously granted access maintained within an accessible distributed ledger or maintained locally within one or more data repositories).

Certain of the exemplary processes described herein, which dynamically manage the access of a third-party application to confidential data based on data indicative of both (i) a level of access previously granted to the third-party application by the user and (ii) a likelihood that the third-party application will process and utilize the accessed confidential data in accordance with the previously granted level of access, may be implemented in addition to, or as an alternate to, one or more of the existing token-based authorization and consent processes, which decouple the granted consent from the subsequent usage and processing of confidential data.

I. Exemplary Computing Environments

FIG. 1 illustrates components of an exemplary computing environment 100, in accordance with some exemplary embodiments. For example, as illustrated in FIG. 1, environment 100 may include one or more computing devices, such as client device 102 operated by user 101. Environment 100 may also include one or more computing systems, such as, but not limited to, one or more custodian systems, such as custodian systems 110 and 130, one or more computing systems operated by a centralized authority (CA), such as CA system 150, and one or more third-party computing systems, such as third-party system 180.

In some instances, each of client device 102, custodian systems 110 and 130, CA system 150, and third-party system 180 may be interconnected across one or more wired or wireless communications networks, such as communications network 120. Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

Client device 102 may include a computing device having one or more tangible, non-transitory memories that store data and/or software instructions, such as memory 105, and one or more processors, such as processor 104, configured to execute the software instructions. As described herein, client device 102 may be associated with or operated by a user, such as user 101, and examples of client device 102 include, but are not limited to, as a smart phone, tablet computer, a desktop computer, a gaming console, a wearable device, or another computing device, system, or apparatus associated with user 101.

The one or more tangible, non-transitory memories of client device 102 may store application programs, application modules, and other elements of code executable by the one or more processors. For example, as illustrated in FIG. 1, client device 102 may maintain, within memory 105, one or more executable third-party applications, such as third-party application 106, and a local credential data store 108. In some instances, each of the third-party applications, including third-party application 106, may be developed by and provisioned to client device 102 by one or more computing systems operated by, or associated with, a corresponding third-party entity, such as third-party system 180. Examples of third-party application 106 include, but are not limited to, a financial management application, an third-party financial aggregator application, and another application that, when executed by processor 104, requests elements of confidential data maintained on behalf of user 101 by one or more computing systems operating within environment 100, such as custodian systems 110 and 130, and processes, aggregates, or displays portions of the requested elements of the confidential data within a corresponding digital interface.

In some instances, local credential data store 108 may maintain, on behalf of third-party application 106, a digital token, cryptogram, hash value, or other element of cryptographic data, e.g., an OAuth token, indicative of a permission of third-party application 106 to access programmatic interfaces established and maintained by each of the custodian systems operating within environment 100, such as, but not limited to, custodian systems 110 and 130. Additionally, local credential data store 108 may maintain, on behalf of third-party application 106, an application-specific credential and a corresponding asymmetric key pair, e.g., which may be generated by the one or more CA systems using any of the exemplary processes described herein. By way of example, and as described herein, the application-specific credential may be indicative of a determined likelihood that third-party application 106 will access and utilize elements of confidential data maintained at the one or more custodian systems (including custodian systems 110 and 130) in accordance with both a level of access granted previously by user 101 and one or more limitations imposed by the financial institutions.

Client device 102 may include a display unit 109A configured to present interface elements to user 101, and an input unit 109B configured to receive input from a user of client device 102, such as user 101. Display unit 109A may include, but is not limited to, an LCD display unit or other appropriate type of display unit, and input unit 109B may include, but is not limited to, a keypad, keyboard, touchscreen, fingerprint scanner, voice activated control technologies, stylus, or any other appropriate type of input unit. Further, in some examples, the functionalities of display unit 109A and input unit 109B may be combined into a single device, such as a pressure-sensitive touchscreen display unit that can present elements (e.g., a graphical user interface) and can detect an input from user 101 via a physical touch. Client device 102 may also include a communications interface 109C, such as a transceiver device, coupled to processor 104 and configured to establish and maintain communications with communications network 120 via one or more appropriate communications protocols.

Referring back to FIG. 1, each of one or more custodian systems (including custodian systems 110 and 130), the one or more CA systems (including CA system 150), and the one or more third-party systems (including third-party system 180) may represent a computing system that includes one or more servers and tangible, non-transitory memory devices storing executable code and application modules. The one or more servers may each include one or more processors or processor-based computing devices, which may be configured to execute portions of the stored code or application modules to perform operations consistent with the disclosed embodiments. Further, in some examples, each of one or more custodian systems (including custodian systems 110 and 130), the one or more CA systems (including CA system 150), and the one or more third-party systems (including third-party system 180) may include a communications unit or interface coupled to the one or more processors for accommodating wired or wireless communication across network 120 with any of the additional network-connected systems or devices described herein, e.g., a transceiver device.

For example, one or more of the custodian systems (including custodian systems 110 and 130), the CA systems (including CA system 150), or the third-party systems (including third-party system 180) may correspond to a discrete computing system, as described herein. In other examples, one or more of the custodian systems (including custodian systems 110 and 130), the CA systems (including CA system 150), or the third-party systems (including third-party system 180) may correspond to a distributed system that includes computing components distributed across one or more networks, such as network 120, or other networks, such as those provided or maintained by cloud-service providers (e.g., Google Cloud™, Microsoft Azure™, etc.).

In some instances, custodian systems 110 and 130 may each maintain elements of confidential data within the one or more tangible, non-transitory memories, e.g., confidential data maintained on behalf of user 101. For example, custodian systems 110 and 130 may each be associated with, or may be operated by, a financial institution that provides financial services to user 101 and other customers, and the confidential data may include, among other things, confidential profile data that characterizes user 101, account data identifying and characterizing one or more financial services accounts or payment instruments held by user 101, or transaction data identifying and characterizing one or more transactions involving the financial services accounts or payment instruments.

Further, each of the third-party systems, including third-party system 180, may be associated with, or operated by, a corresponding third-party entity unrelated to the financial institutions that are associated with, or that operate, the custodian systems. For example, and as described herein, third-party application 106 may developed and provisioned to client device 102 by one of the third-party systems, such as third-party system 180. Further, in some instances, each of the CA computing systems, including CA system 150, may be associated with, and operated by, a centralized authority associated with each of the financial institutions, such as, but not limited to, a regulatory entity, a governmental entity, or a consortium of the financial institutions acting on a consensus basis.

Referring back to FIG. 1, and to perform any of the exemplary processed described herein, each of custodian systems 110 and 130 may maintain, may maintain, within the one or more tangible, non-transitory memories, a data repository (e.g., a respective one of data repositories 112 and 132) that includes a user database (e.g., a respective one of user databases 114 and 134), a confidential data store (e.g., a respective one of confidential data stores 116 and 136), and a credential data store (e.g., a respective one of credential data stores 118 and 138).

For example, user databases 114 and 134 may include data records that identify and characterize one or more users of respective ones of custodian systems 110 and 130, e.g., user 101. For example, and for each of the users, the data records of user databases 114 and 134 may include a corresponding user identifier (e.g., an alphanumeric login credential assigned to user 101), and data that uniquely identifies one or more devices (such as client device 102) associated with or operated by that user (e.g., a unique device identifier, such as an IP address, a MAC address, a mobile telephone number, etc., that identifies client device 102).

Confidential data stores 116 and 136 may maintain elements of confidential customer data on behalf of user 101 and other users of respective ones of custodian system 110 and 130, such as, but not limited to, For example, confidential data stores 116 and 136 may include confidential account data and confidential transaction data that identify and characterize a balance or transaction history of one or more payment instruments, deposit accounts, brokerage accounts, or other financial services accounts issued to user 101 (e.g., by the financial institutions that operate respective ones of custodian systems 110 and 130), along with customer profile data that identifies and characterizes user 101, such as, but not limited to, a name or an address of user 101.

Further, in some instances, each of the elements of confidential account data, confidential transaction data, and confidential customer profile data may also be associated with a unique identifier of a corresponding user (e.g., an alphanumeric login credential assigned to user 101) or a unique identifier of a device associated with that corresponding user (e.g., an IP address, MAC address, or mobile telephone number of client device 102). As such, each of the elements of confidential account data, confidential transaction data, and confidential customer profile data maintained within confidential data stores 116 and 136 may be associated with, or linked to, a corresponding data record within a respective one of user databases 114 and 134.

Credential data stores 118 and 138 may maintain, for one or more third-party applications, such as third-party application 106, information indicative of a successful outcome of one or more of the exemplary decoupled consent and permissioning protocols described herein, which may be implemented collectively by client device 102 (e.g., though executed third-party application 106) and respective ones of custodian systems 110 and 130. By way of example, credential data stores 118 and 138 may maintain, on behalf of third-party application 106, a digital token, cryptogram, hash value, or other element of cryptographic data, e.g., an OAuth token, indicative of a permission of executed third-party application 106 to access a programmatic interface established and maintained by custodian system 110, and further, to access elements of confidential data maintained within confidential data store 116, e.g., in accordance with user 101's previously granted consent. In other examples, credential data stores 118 or 138 may maintain, on behalf of third-party application 106, an additional digital token, cryptogram, hash value, or other element of cryptographic data, e.g., an additional OAuth token, indicative of a permission of executed third-party application 106 to access a programmatic interface established and maintained by custodian system 130, and further, to access elements of confidential data maintained within confidential data stores 116 or 136, e.g., in accordance with user 101's previously granted consent.

Further, in some examples, one or more of credential data stores 118 or 138 may also maintain, on behalf of third-party application 106, an application-specific credential indicative of a determined likelihood that third-party application 106 will access and utilize elements of confidential data maintained at respective ones of custodian systems 110 or 130 in accordance with both the respective level of access granted previously by user 101 and further, in accordance with one or more limitations imposed by the financial institution associated with respective ones of custodian systems 110 or 130. For example, the application-specific credential may be generated by the one or more of the CA systems operating within environment 100, such as CA system 150, and examples of the application-specific credential include, but are not limited to, a digital token, a cryptogram, or a hash value having a predetermined structure. Additionally, in some examples, credential data stores 118 or 138 may also maintain a public and a private cryptographic key pair assigned to third-party application 106, e.g., by CA system 150 using any of the exemplary processes described herein.

Each of custodian systems 110 and 130 may also maintain, within corresponding ones of the tangible, non-transitory memories, one or more executable application programs, such as, but not limited to, respective ones of on-boarding engines 121 and 141 and respective ones of consent and permissioning engines 122 and 142. By way of example, when executed by the one or more processors of custodian system 110, on-boarding engine 121 may perform operations that, in conjunction with a third-party system associated with third-party application 106 (e.g., third-party system 180), and with the one or more CA systems (e.g., CA system 150), generate an application-specific credential indicative of a determined likelihood that third-party application 106 will manage elements of confidential data in accordance with the granted level of access and with one or more limitations imposed by the custodian systems. Further, when executed by the one or more processors of custodian system 130, on-boarding engine 141 may perform similar operations.

In further examples, when executed by the one or more processors of custodian system 130, consent and permissioning engine 142 may perform operations that receive a request for an element of confidential data from executed third-party application 106, and that selectively provision the requested element of confidential data to executed third-party application 106 based on (i) a determined consistency between the request and the level of access previously granted to third-party application 106 (e.g., based on the reference OAuth token maintained in credential data store 138) and (ii) a determined likelihood that executed third-party application 106 will manage elements of confidential data in accordance with the granted level of access and with one or more limitations imposed by the custodian system 130, e.g., as indicated by the application-specific credential associated with third-party application 106. Further, when executed by the one or more processors of custodian system 110, consent and permissioning engine 122 may perform similar operations.

Referring back to FIG. 1, and to perform any of the exemplary processed described herein, CA system 150 may maintain, within the one or more tangible, non-transitory memories, a data repository 152 that includes a criteria data store 154 and a credential data store 156. Further, CA system 150 may also maintain within the one or more tangible, non-transitory memories, one or more executable application programs that include, but are not limited to, a centralized on-boarding engine 158 and re-evaluation engine 160. Each additional, or alternate, one of the CA systems operating within environment 100 may maintain, within the one or more tangible, non-transitory memories, a similar data repository maintaining similar data stores, along with similar application programs, as described herein.

In some instances, criteria data store 154 may specify a plurality of data-access criteria (e.g., "on-boarding" criteria) that, when applied to data that identifies and describes third-party application 106 and a related third-party entity, facilitates a determination of a current likelihood that that third-party application 106 will manage elements of confidential data in accordance with: (i) the level of access previously granted by user 101; and (ii) any limitations imposed by the custodian systems operating within environment 100. By way of example, and when executed by the one or more processors of CA system 150, centralized on-boarding engine 158 may perform any of the exemplary processes described herein to apply the on-boarding criteria to the received on-boarding information, and to determine the current likelihood that that third-party application 106 will manage the elements of confidential data in accordance with user 101 previously granted level of access and the imposed by the custodian systems operating within environment 100, e.g., to determine whether third-party application 106 should be "trusted" to access, manage, and utilize the elements of confidential data.

Based on a determination that third-party application 106 should be trusted to access, manage, and utilize the elements of confidential data, executed centralized on-boarding engine 158 may perform any of the exemplary processes described herein to generate an application-specific credential indicative of the determination, and to generate and assign to third-party application 106 a public and private cryptographic key pair. Further, and as described herein, the one or more CA systems, including CA system 150, may perform consensus-based operations that record the application-specific credential, the public and private cryptographic key pair, and data identifying third-party application 106 within one or more ledger blocks of a cryptographically secure distributed ledger, e.g., credential ledger blocks 176 of distributed ledger 170.

Further, in some examples, criteria data store 154 may also specify a plurality of additional data-access criteria (e.g., "re-evaluation" criteria) that, when applied to additional information that describing a management or usage of the elements of confidential data by third-party application 106, or a change in a governmental, judicial, or regulatory standing of a third-party entity associated with third-party application 106, facilitates a re-evaluation of the previously determined likelihood that third-party application 106 will manage elements of confidential data in accordance with: (i) the level of access previously granted by user 101; and (ii) any limitations imposed by the custodian systems operating within environment 100.

By way of example, and when executed by the one or more processors of CA system 150, re-evaluation engine 160 may perform any of the exemplary processes described herein that, based on the additional information, modify or revoke (e.g., temporarily or permanently) an ability of third-party application 106 to access the elements of confidential data maintained by custodian system 110, custodian system 130, or any additional, or alternate, custodian system operating within environment 100. As described herein, CA system 150 may also perform consensus-based operations that, in conjunction with the other CA systems operating within environment 100, generate one or more additional ledger blocks that include revocation data, e.g., a data flag, indicative of the modified or revoked ability of third-party application 106 to access the elements of confidential data within one or more additional ledger blocks, and to append these additional ledger blocks to distributed ledger 170, thus generating an updated version of distributed ledger 170.

Through these exemplary embodiments, each of the CA systems operating within environment 100, including CA system 150, may represent a "peer system" within a distributed-ledger network and as such, may perform consensus-based operations that establish, maintain, and distribute among permissioned systems operating within the distributed-ledger network any of the cryptographically secure distributed ledgers described herein, such as distributed ledger 170. As described herein, the distributed ledger network may include, but is not limited to, each of the CA systems operating within environment 100, such as CA system 150, and at least a subset of the custodian systems operating within environment 100, such as custodian systems 110 and 130. Further, distributed ledger 170 may include smart contract ledger blocks 172, which immutably record elements of code that establish a distributed smart contract, criteria ledger blocks 174, which immutably record all or a portion of the on-boarding and re-evaluation criteria described herein, and credential ledger blocks 176, which immutably record the application-specific credentials and the public and private cryptographic key pairs described herein.

II. Exemplary Computer-Implemented Processes for Dynamically Establishing and Managing Consent, Permissioning, and Trust in an Open Banking Environment Given the confidential nature of the data maintained by each of the custodian systems within environment 100, and the judicial, governmental, and regulatory scrutiny associated with the security of the maintained confidential data, the financial institutions associated with these custodian systems may collectively establish one or more data-access policies that limit the ability of third-party applications to access, or subsequently use, manage, or distribute, elements of confidential data maintained at the corresponding custodian systems. As described herein, one or more computing systems associated with a centralized authority, may perform operations that apply these data-access policies to elements of information, e.g., "on-boarding" information, that characterizes a third-party entity associated with a particular third-party application, such as third-party application 106 of FIG. 1.

In some examples, and based on the application of these data-access policies to the on-boarding information, one or more of the CA computing systems described herein, such as CA computing system 150, may establish an initial determination of whether the financial institutions should "trust" third-party application 106 to access, and subsequently manage, elements of confidential data maintained by the custodian systems in accordance with a level of access granted by a user, e.g., user 101, and in accordance with certain limitations imposed by the financial institutions. Based on the initial determination that third-party application 106 should be trusted to access the elements of confidential data, the one or more of the CA systems, such as CA system 150, may generate an application-specific credential indicative of the trusted status of third-party application 106, and provision the application-specific credential not only to the custodian systems (e.g., custodian systems 110 and 130), but also to the network-connected devices or systems that execute third-party application 106 (e.g., client device 102).

Figure 2A:
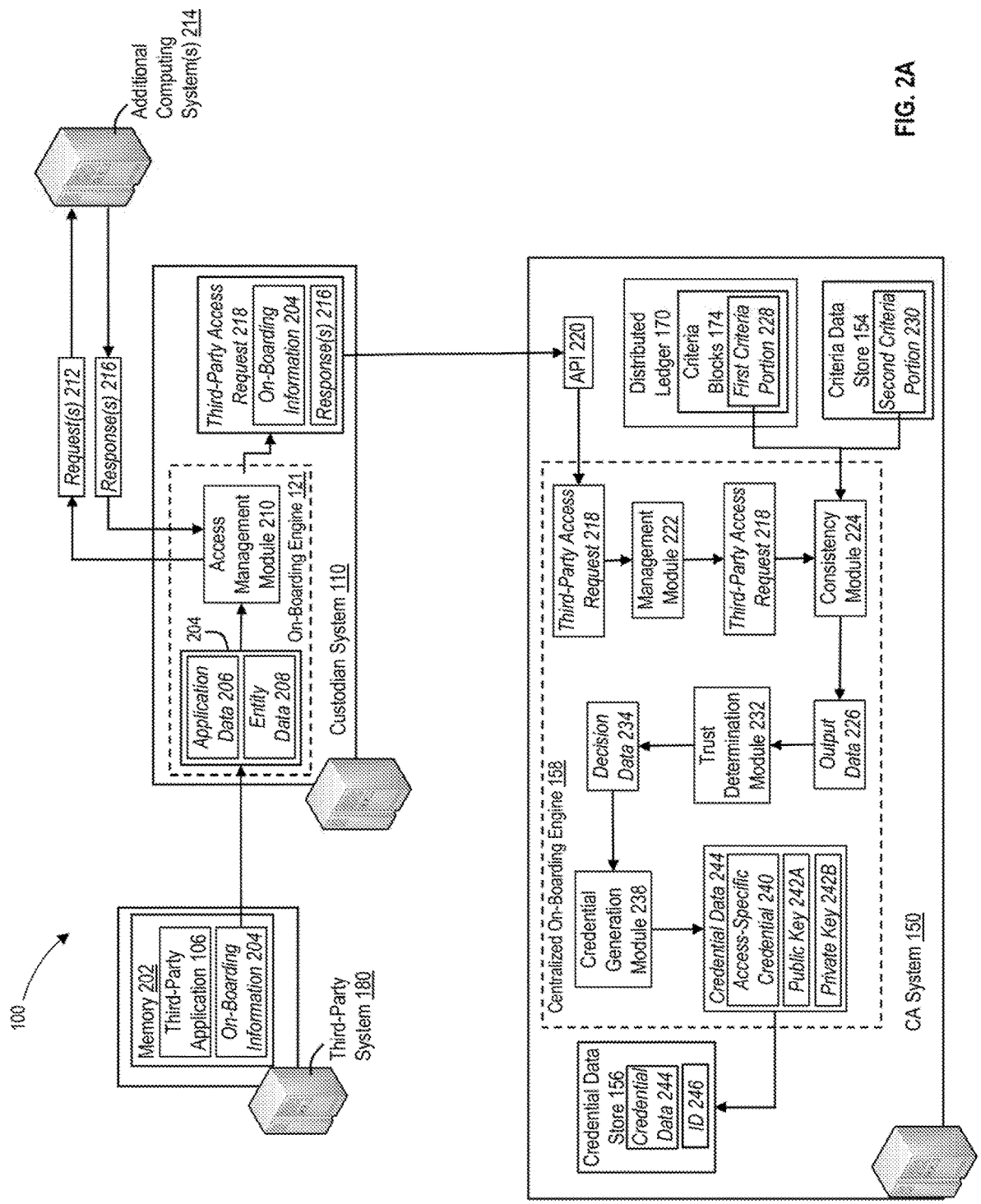
FIGS. 2A-2C, 3A, 3B, 4A, and 4B are diagrams illustrating portions of an exemplary computing environment, in accordance with some embodiments.
Figure 2B:
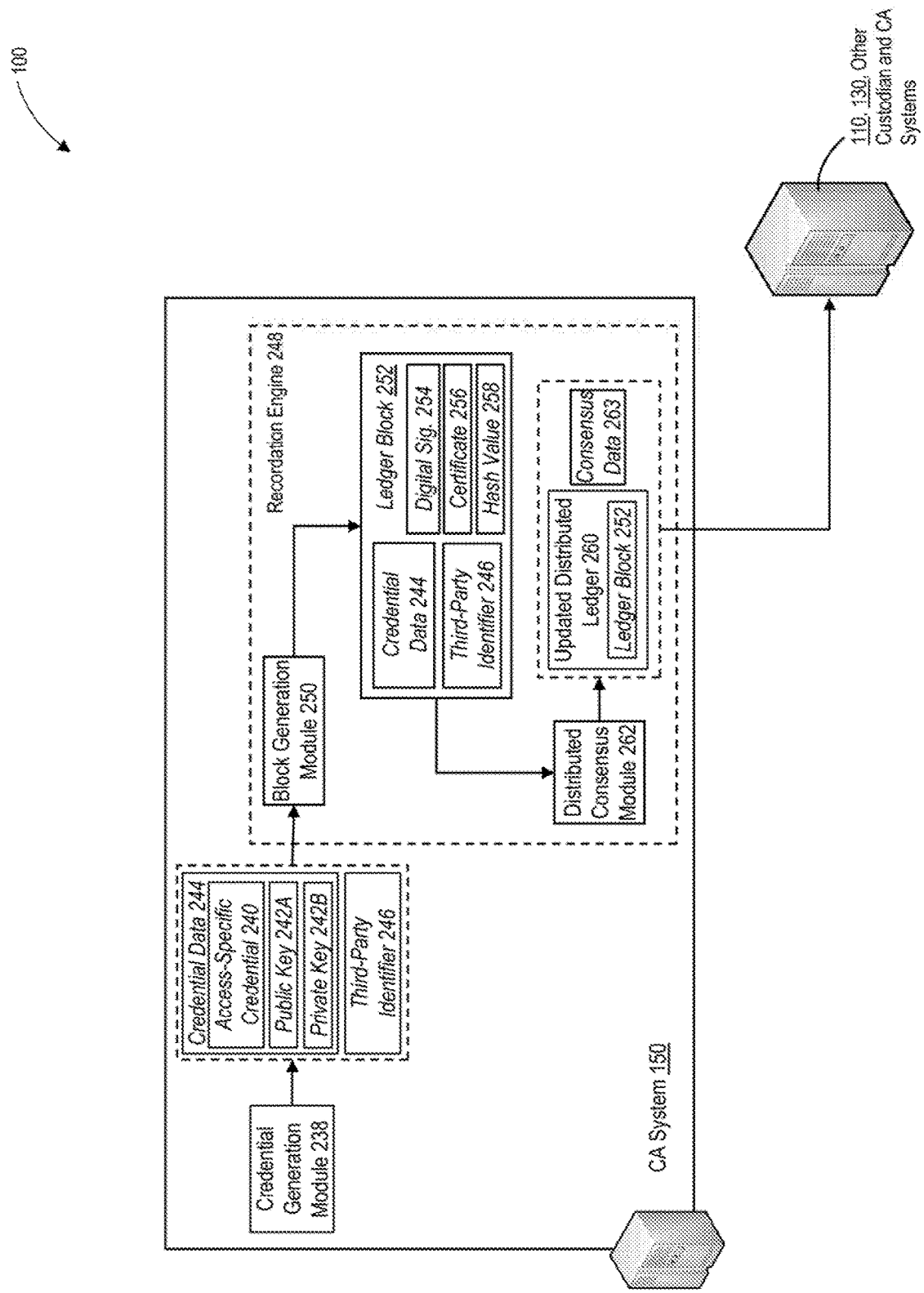
Figure 2C:
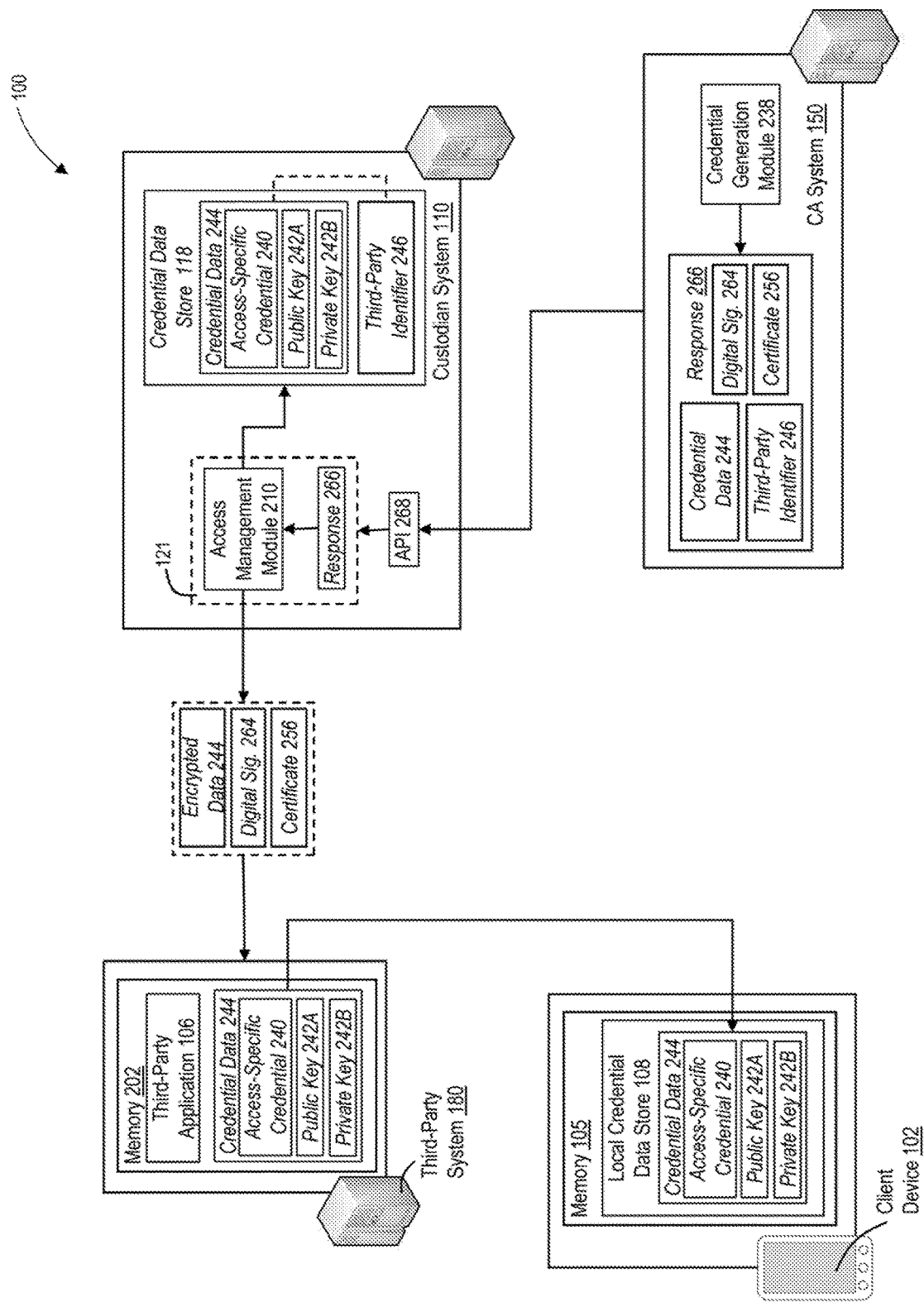

FIGS. 2A-2C illustrate portions of computing environment 100, in accordance with some exemplary embodiments. Referring to FIG. 2A, third-party system 180 may perform operations that develop and support a third-party application, such as third-party application 106, which may be provisioned to one or more network-connected devices or systems operating within environment 100, such as client device 102. Examples of third-party application 106 include, but are not limited to, a financial management application or a third-party financial aggregator application, as described herein.

As illustrated in FIG. 2A, third-party system 180 may maintain third-party application 106 within a portion of a tangible, non-transitory memory 202, along with elements of on-boarding information 204 that identifying and characterize not only third-party application 106, but also a third-party entity associated with third-party system 180 and third-party application 106. For example, on-boarding information 204 may include, but is not limited to, application data that uniquely identifies third-party application 106 (e.g., an application cryptogram, an application name, etc.) and entity data that uniquely identifies and characterizes the third-party entity. In some instances, the entity data may include, but is not limited to, a name, a current address, a tax identification number, and a jurisdiction in which the third-party entity is incorporated (e.g., a province, a state, etc.).

In further instances, on-boarding information 204 may also include operational data that characterizes an expected access, management, or usage of the elements of confidential data by third-party application 106. For example, the operational data may identify one or more particular types of confidential data (e.g., confidential account, transaction, or customer profile data, etc.) that third-party application 106 expects to access from the one or more custodian systems within environment 100, and further, an amount of confidential data that third-party application 106 expects to access during various temporal intervals (e.g., on an hourly basis, a daily basis, etc.). Additionally, and in some examples, on-boarding information 204 may identify one or more operations that third-party application 106 expects to perform on the elements of confidential data, such as, but not limited, an aggregation operation, a comparison operation, or a presentation operation, e.g., generating interface elements representative of the elements of confidential data for presentation in a digital interface.

In additional instances, on-boarding information 204 may include distribution that characterizes an expected distribution of the elements of confidential data by third-party application 106. For example, the distribution data may include a unique identifier, e.g., an Internet Protocol (IP) address, of one or more network-connected computing systems or devices to which third-party application 106 expects to distribute the accessed or processed elements of confidential data, such as, but not limited to, third-party system 180. Further, the distribution data may also include information that characterizes a frequency of each expected distribution and an expected volume of data associated with each expected distribution. The disclosed embodiments are, however, not limited to these exemplary elements of on-boarding information 204, and in other examples, on-boarding information 204 may include any additional or alternate elements of information that characterize third-party application 106, the third-party entity, or an expected interaction between third-party application 106 and the one or more custodian systems operating within environment 100.

Referring back to FIG. 2A, third-party system 180 may perform operations that transmit (e.g., via the communications interface) on-boarding information 204 across network 120 to a corresponding one of the custodian systems operating within environment 100, such as custodian system 110. Custodian system 110 may receive on-boarding information 204, and upon execution by the one or more processors of custodian system 110, on-boarding engine 121 may perform operations that parse on-boarding information to identify and extract elements of application data 206, which uniquely identifies third-party application 106, and entity data 208, which identifies and characterizes the third-party entity.

As illustrated in FIG. 2A, an access management module 210 of executed on-boarding engine 121 may generate one or more data requests 212 for elements of standing or audit data characterizing third-party application 106 or the third-party entity, and perform operations that cause custodian system 110 to transmit data requests 212 across network 120 to one or more additional computing systems 214. Examples of additional computing systems 214 include, but are not limited to, computing systems maintained by one or more governmental, judicial, or legal entities, or a computing system maintained by an external auditor that monitors an access and management of confidential data by other third-party applications developed by the third-party entity.

In some instances, data requests 212 may include all or a portion of entity data 208, such as, but not limited to, the entity name, the tax identification number, and the jurisdiction of incorporation of the third-party entity. Additionally, or alternatively, data requests 212 may also include at a portion of application data 206, such as, but not limited to the name of third-party application 106. As illustrated in FIG. 2A, each of additional computing systems 214 may receive data requests 212 (e.g., through a corresponding programmatic interface), may parse data requests 212 to extract the portions of application data 206 and/or entity data 208, and access one or more locally accessible governmental, judicial, regulatory, or audit data repositories to obtain elements of standing information or audit information characterizing the third-party entity or third-party application 106.

By way of example, the standing information may include, among other things data, a reference address associated with the third-party entity, a reference jurisdiction of incorporation, and/or a time during which the third-party entity was incorporated within the reference jurisdiction (e.g., as maintained within the one or more governmental data repositories). The elements of standing information may also include data the identifies an existence or an absence of a tax lien imposed upon the third-party entity or of a judicial holding against the third-party entity (e.g., as maintained within the one or more governmental or judicial data repositories), and additionally, or alternatively, data that identifies one or more licenses currently or previously held by the third-party entity or one or disciplinary actions imposed on the third-party entity by a regulatory (e.g., as maintained within the one or more regulatory data repositories).

Further, in some examples, the audit information may include, among other things, data that identifies one or more detected instances of mismanagement of confidential data by third-party application 106, third-party system 180, or other third-party applications developed by the third-party entity (e.g., as maintained within the one or more audit data repositories). The elements of audit information may also include data that identifies one or more complaints alleging that that third-party application 106, third-party system 180, or other third-party applications developed by the third-party entity mismanaged confidential information, e.g., by not adequately protecting, and prohibiting access to, the confidential information (e.g., as further maintained within the one or more audit data repositories). The disclosed embodiments are, however, not limited to these examples of standing and audit information, and in other instances, the elements of standing or audit information may include any additional or alternate information associated with the third-party entity, third-party systems 180, or third-party application 106 and maintained within governmental, judicial, regulatory, or audit data repositories accessible to additional computing systems 214.

Referring back to FIG. 2A, each of additional computing systems 214 may perform operations that packaged the obtained elements of standing or audit information within a corresponding elements of response data 216, which additional computing systems 214 may transmit back to executed access management module 210, e.g., via a corresponding programmatic interface (not illustrated in FIG. 2A). Executed access management module 210 may receive each of the elements of response data 216, and may perform operations that package on-boarding information 204 and received response data 216 into corresponding portions of a third-party access request 218, which custodian system 110 may broadcast across network 120 to at least one of the CA systems operating within environment 100, including CA system 150.

In some examples, executed access management module 210 may also perform operations that apply a digital signature to third-party access request 218 using a private cryptographic key, and may perform operations that cause custodian system 110 to broadcast the applied digital signature, a public key certificate of custodian system 110 (e.g., that includes the corresponding public cryptographic key), and third-party access request 218 across network 120 to the at least one of the CA systems operating within environment 100. A programmatic interface established and maintained by CA system 150, such as an application programming interface (API) 220 of centralized on-boarding engine 158, may receive third-party access request 218 (and in some instances, the applied digital signature and the public key certificate), and may route third-party access request 218 to centralized on-boarding engine 158, e.g., as executed by the one or more processors of CA system 150.

In some examples, a management module 222 of executed centralized on-boarding engine 158 may receive the third-party access request 218, and further, the applied digital signature and the public key certificate, and may perform operations that validate the applied digital signature using the public cryptographic key within the public key certificate. If management module 222 were unable to validate the applied digital signature, executed centralized on-boarding engine 158 may decline to on-board third-party application 106 into an open-banking environment that includes, among other things, at least a subset of the custodian systems operating within environment 100. Although not illustrated in FIG. 2A, executed centralized on-boarding engine 158 may generate an error message, which CA system 150 may transmit across network 120 to custodian system 110.

Alternatively, if management module 222 were to successful validate the applied digital signature, executed centralized on-boarding engine 158 may perform any of the exemplary processes described herein that determine whether third-party application 106 should be trusted to access and manage confidential data maintained by the one or more custodian systems operating within environment 100, e.g., based on an application of a plurality of data access criteria (e.g., "on-boarding" criteria) to corresponding portions of data access request 218. As described herein, one or more of the data access criteria may be specified by the financial institutions that are associated with, or that operate, the custodian systems within environment 100, such as the financial institutions associated with custodian systems 110 and 130. In other instances, additional ones of the data access criteria may be specified by at least one of a judicial entity, a regulatory entity, or a governmental entity that monitor these financial institutions.

As illustrated in FIG. 2A, and responsive to the successful validation of the applied digital signature and the identity of custodian system 110, management module 220 may route third-party access request 218 to a consistency module 224 of executed centralized on-boarding engine 158, which may perform operations that obtain data identifying each of the on-boarding criteria described herein. In some examples, at least portion of the on-boarding criteria may be recorded immutably within one or more ledger block of cryptographically secure distributed ledger 170, e.g., within criteria ledger blocks 174 of distributed ledger 170. As illustrated in FIG. 2A, consistency module 224 may identify and access distributed ledger 170, e.g., as maintained within data repository 152, and may perform operations that extract a first portion 228 of the on-boarding criteria from criteria ledger blocks 174.

In other examples, one or more additional portions of the on-boarding criteria may be locally maintained by CA system 150 within data repository 152, e.g., within criteria data store 154. As further illustrated in FIG. 2A, consistency module 224 may also access criteria data store 154 of data repository 152, and may perform operations that extract a second portion 230 of the on-boarding criteria from criteria data store 154. Consistency module 224 may perform further operations that parse third-party access request 218 to extract the elements of on-boarding information 204 and the elements of response data 216, and that establish a consistency between the on-boarding criteria within extracted first portion 228, and additionally, or alternatively, within extracted second portion 230, and the elements of on-boarding information 204 and the elements of response data 216.

For example, the on-boarding criteria (e.g., as included with extracted first portion 228 or extracted second portion 230) may specify at least one residency criterion. In some instances, the at least one residency criterion may require an address of the third-party entity specified within the elements of on-boarding information 204 be identical to a corresponding address specified within the elements of response data 216, and additionally, or alternatively, that a jurisdiction of incorporation the third-party entity specified within the elements of on-boarding information 204 be identical to a corresponding jurisdiction of incorporation specified within the elements of response data 216.

In other examples, the on-boarding criteria (e.g., as included with extracted first portion 228 or extracted second portion 230) may also include at least on access-specific criterion associated with the expected access, management, or usage of the elements of confidential data by third-party application 106. For instance, the at least one access-specific criterion may limit a permission of third-party application 106 to access one or more particular types of confidential data (e.g., confidential data identifying transaction dates and transaction amounts, but not payment instruments, confidential data identifying account balances, but not account numbers, etc.), or may impose an upper bound on a volume of confidential data accessible to third-party application 106 during a particular temporal interval). In other instances, the at least one access-specific criteria may impose a limitation on an ability of third-party application 106 to perform one or more expected operations on elements of confidential data (e.g., aggregation and presentation operations, but not any local storage of confidential data) and additionally, or alternatively, may restrict an ability of third-party application 106 to distribute confidential data to any additional or alternate computing systems or device, including third-party system 180.

Further, in some examples, the on-boarding criteria (e.g., as included with extracted first portion 228 or extracted second portion 230) may also include at least one standing-based criterion associated with the judicial, regulatory, or governmental, standing of the third-party entity and additionally, or alternatively, at least one audit-based criterion associated with an audit status of the third-party entity. For instance, the at least one standing-based criterion may specify that the third-party entity be associated with neither a judicial holding nor an imposed tax lien, or that the third-party entity maintain a current license issued by one or more regulatory entities. Further, the at least one audit-based criterion may require that none of third-party application 106 or any additional or alternate third-party application developed by the third-party entity be associated with a detected instance of mismanagement of confidential data. The disclosed embodiments are, however, not limited to these examples of on-boarding criterial, and in other instances, the on-boarding criteria may include any additional or alternate criterion that, if satisfied by the elements of on-boarding information 204 and response data 216, indicates a likelihood that third-party application 106 will access and management elements of confidential data in accordance with a level of access granted by user 101 or one or more limitations imposed on third-party application 106 by the financial institutions associated with the custodian systems.

Referring back to FIG. 2A, consistency module 224 may perform operations that determine whether on-boarding information 204 and response data 216 satisfy, and are consistent with, each of the on-boarding criteria included within extracted first portion 228 or extracted second portion 230, and that generate elements of output data 226 that, for each of the on-boarding criteria, indicates a determined consistency or determined inconsistency. For example, each of the elements of output data 226 may include a binary flag, the value of which may indicate the determined consistency (e.g., a value of unity) or determined inconsistency (e.g., a value of zero). The elements of output data 226 may also include data identifying corresponding ones of the on-boarding criteria, and in some instances, for a determined inconsistency, additional data that specifies a source of the determined inconsistency. Consistency module 224 may further provide output data 226 as an input to a trust determination module 232 of executed centralized on-boarding engine 158, which may perform any of the exemplary processes described herein that determine whether the financial institutions may trust third-party application 106 to access and manage confidential data maintained by the custodian systems in accordance with a level of access previously granted by user 101.

For example, trust determination module 232 may parse output data 226 and determine that on-boarding information 204 and response data 216 satisfy each of, or at least a predetermined threshold portion of, the on-boarding criteria. Based on this determination, trust determination module 232 may generate decision data 234, which indicates both a determined likelihood that third-party application 106 will access and manage confidential data maintained by the custodian systems in accordance with the previously granted level of access, and a determination that third-party application 106 should be on-boarded into the trusted, open-banking network.

Alternatively, if trust determination module 232 were to establish that the extracted elements of on-boarding information 204 and response data 216 fail to satisfy all or at least the predetermined threshold portion of the on-boarding criteria, trust determination module 232 may determine that third-party application 106 is unlikely to access and manage the confidential data in accordance with the previously granted level of access, and as such, may determine that third-party application 106 should not be on-boarded into the open-banking network. Based on these additional determinations, executed centralized on-boarding engine 158 may generate an error message for transmission across network 120 to custodian system 110 (not illustrated in FIG. 2A).

Referring back to FIG. 2A, trust determination module 232 may provide decision data 234 as an input to a credential generation module 238 of executed centralized on-boarding engine 158. Credential generation module 238 may, for example, receive decision data 234, and may perform operations that generate an application-specific credential 240 that reflects the determined likelihood that third-party application 106 will access and manage confidential data maintained by the custodian systems in accordance with the previously granted level of access.

In some instances, credential generation module 238 may perform operations that generate application-specific credential 240 based on an application of one or more credential-generation algorithms (e.g., a tokenization process, a hash function, a random number generator, etc.) to selected portions of the information that identifies third-party application 106, third-party system 180, or the now-trusted third-party entity, e.g., as extracted from third-party access request 218. Examples of application-specific credential 240 include, but are not limited to, a digital token, a cryptogram, a hash value, a random number, or another element of cryptographic or non-cryptographic data having a structure or a formal recognizable by the custodian systems operating within environment 100, such as custodian systems 110 and 130.

Credential generation module 238 may also perform operations that generate, and assign to third-party application, a public cryptographic key 242A and a private cryptographic key 242B. Credential generation module 238 may package application-specific credential 240, public cryptographic key 242A, and private cryptographic key 242B into credential data 244, and may store credential data 244 within a corresponding portion of credential data store 156 (e.g., as maintained within data repository 152), along with an identifier 246 of third-party application 106. In some instances, and as described herein, credential data store 156 may be accessible, via a programmatic interface across network 120, to one or more application programs executed by each of the custodian systems operating within environment 100, including custodian systems 110 and 130.

Referring to FIG. 2B, credential generation module 238 may provide credential data 244 (including application-specific credential 240, public cryptographic key 242A, private cryptographic key 242B) and identifier 246 as inputs to a recordation engine 248 of CA system 150. When executed by the one or more processors of CA system 150, recordation engine 248 may perform operations that cause CA system 150 to broadcast credential data 244 and identifier 246 across network 120 to each of the additional CA systems operating within environment 100, which may facilitate performance of consensus-based operations described herein that that, among other things, record credential data 244 and identifier 246 within an additional ledger block of a cryptographically secure distributed ledger and broadcast an updated version of that distributed ledger, which includes the additional ledger block, among the CA systems and custodian systems within environment 100.

For example, and to facilitate a performance of these consensus-based processes at CA system 150, a block generation module 250 of executed recordation engine 248 may perform operations that generate a new ledger block 252 that includes credential data 244 (e.g., including application-specific credential 240, public cryptographic key 242A, and private cryptographic key 242B) and identifier 246 of third-party application 106. Further, block generation module 250 may also perform operations that, using a private cryptographic key of the centralized authority, generate and apply a digital signature 254 to credential data 244 and identifier 246, and may package digital signature 254 into a corresponding portions of a ledger block 252, along with a public key certificate 256 of centralized authority (e.g., that includes a corresponding public cryptographic key). Further, block generation module 250 may also compute a hash value 258 representative of credential data 244, identifier 246, and in some instances, digital signature 254 (e.g., using an appropriate hash function), and may package hash value 258 into a corresponding portion of ledger block 252.

CA system 150 (and each additional or alternate one of the CA systems of environment 100) may perform additional operations that append to ledger block 252 to distributed ledger 170 to generate a latest, longest version of the distributed ledger (e.g., an updated distributed ledger 260). For example, the additional operations may be established through a distributed consensus among additional ones of the CA systems, and may include, but are not limited to, the calculation of an appropriate proof-of-work or proof-of-stake by a distributed consensus module 262 of executed recordation engine 248 prior to the other CA systems within environment 100. In certain aspects, CA system 150 may broadcast evidence of the calculated proof-of-work or proof-of-stake to the additional ones of the CA systems of environment 100 across network 120 (e.g., as consensus data 263).

CA system 150 may also broadcast updated distributed ledger 260 to the additional ones of the CA systems of environment 100 and additionally or alternatively, to each of the custodian systems operating within environment 100, including custodian systems 110 and 130, e.g., through a secure, programmatic interface. In some instances, not illustrated in FIG. 2B, custodian systems 110 and 130 may perform operations that store updated distributed ledger 260 within a portion of respective ones of data repositories 112 and 132, e.g., to replace corresponding ones of distributed ledger 170.

CA computing system 150 may also perform operations that provision all or a portion of credential data 244 across network 120 to custodian system 130, e.g., as a response to third-party access request 218. For example, and referring to FIG. 2C, credential generation module 238 may perform operations that generate and apply a digital signature 264 to credential data 244 and identifier 246 of third-party application 106, e.g., using the private cryptographic key of the centralized authority. Credential generation module 238 may also package credential data 244 (including application-specific credential 240, public cryptographic key 242A, and private cryptographic key 242B), identifier 246, digital signature 264, and public key certificate 256 of the centralized authority into corresponding portions of a response 266 to third-party access request 218, which CA system 150 may transmit across network 120 to custodian system 110.

A secure, programmatic interface established and maintained by custodian system 110, e.g. an application programming interface (API) 268, may receive and route response 266 to access management module 210 of executed onboarding engine 121. In some instances, access management module 210 may perform operations that decrypt and validate digital signature 264 using the public cryptographic key included within public key certificate 256. Responsive to a successful validation of digital signature 264, access management module 210 may perform additional operations that store credential data 244, which includes application-specific credential 240, public cryptographic key 242A, and private cryptographic key 242B within a corresponding portion of credential data store 118, e.g., in conjunction with identifier 246 of third-party application 106.

Further, in some instances, access management module 210 may also encrypt credential data 244, e.g., using a public cryptographic key of third-party system 180, and may generate and apply a digital signature 272 to encrypted credential data 270, e.g., using a private cryptographic key of custodian system 110. Access management module 210 may perform operations that cause custodian system 110 to transmit encrypted credential data 270, digital signature 272, and a public key certificate 274 of custodian system 110 (e.g., that includes a corresponding public cryptographic key) across network 120 to third-party system 180.

A secure, programmatic interface established and maintained by third-party system 180, such as an application programming interface (not illustrated in FIG. 2C), may receive encrypted credential data 270 and public key certificate 274. In some instances, third-party system 180 may perform operations that validate digital signature 272, e.g., using the public cryptographic key extracted from certificate 274. Based on a successful validation of digital signature 272, third-party system 180 may perform operations that decrypt encrypted credential data 270, e.g., using a corresponding public cryptographic key, and may store credential data 244, which includes application-specific credential 240, public cryptographic key 242A, and private cryptographic key 242B of third-party application 106 within memory 202.

Third-party system 180 may also perform operations that provision credential data 244, which includes application-specific credential 240, public cryptographic key 242A, and private cryptographic key 242B of third-party application 106, to each of the network-connected computing systems or devices that execute third-party application 106. For example, as illustrated in FIG. 2C, client device 102 may store the provisioned elements of credential data 244, which includes application-specific credential 240, public cryptographic key 242A, and private cryptographic key 242B, within corresponding portions of local credential data store 108.

Figure 3A:
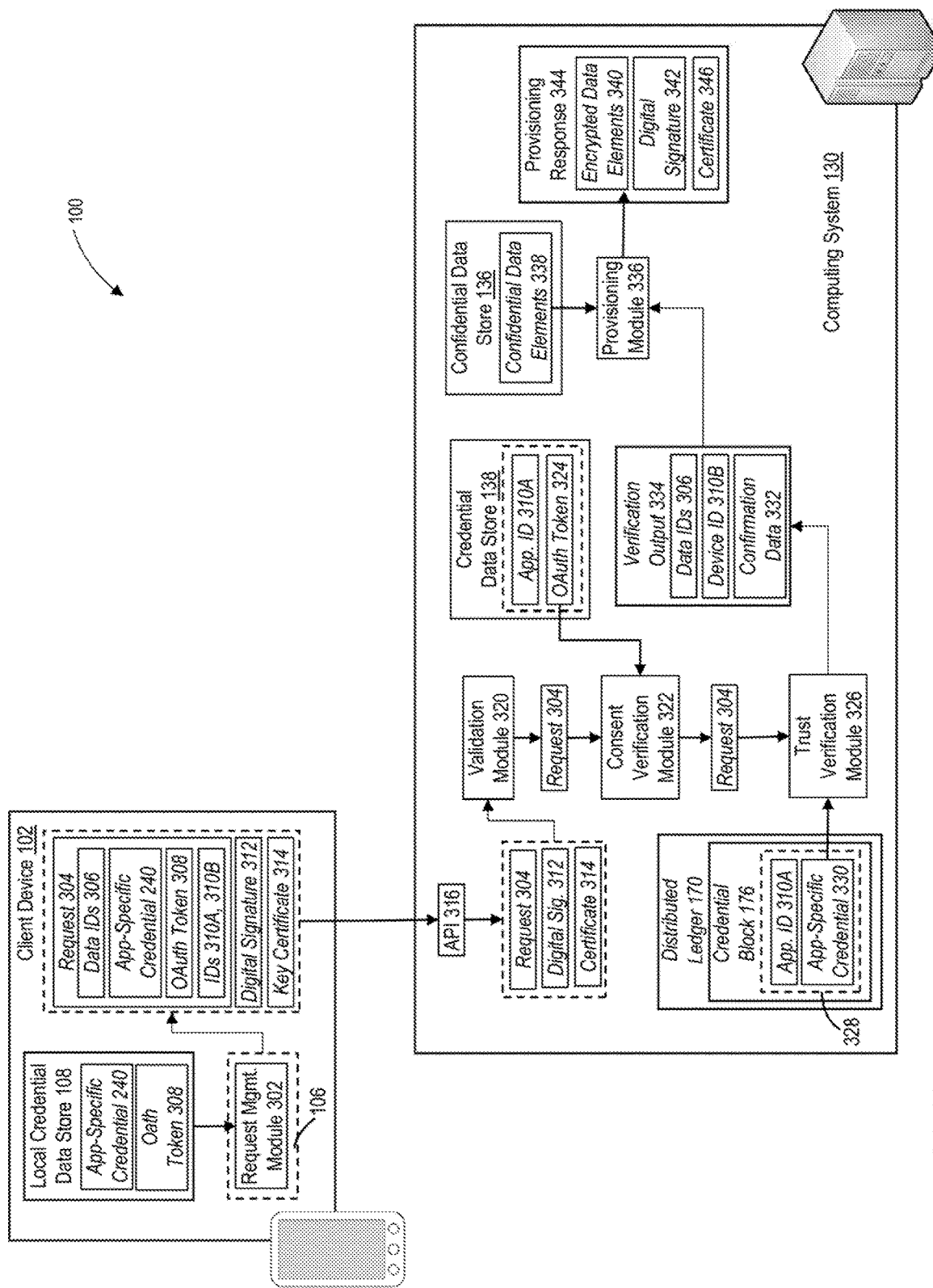
Figure 3B:
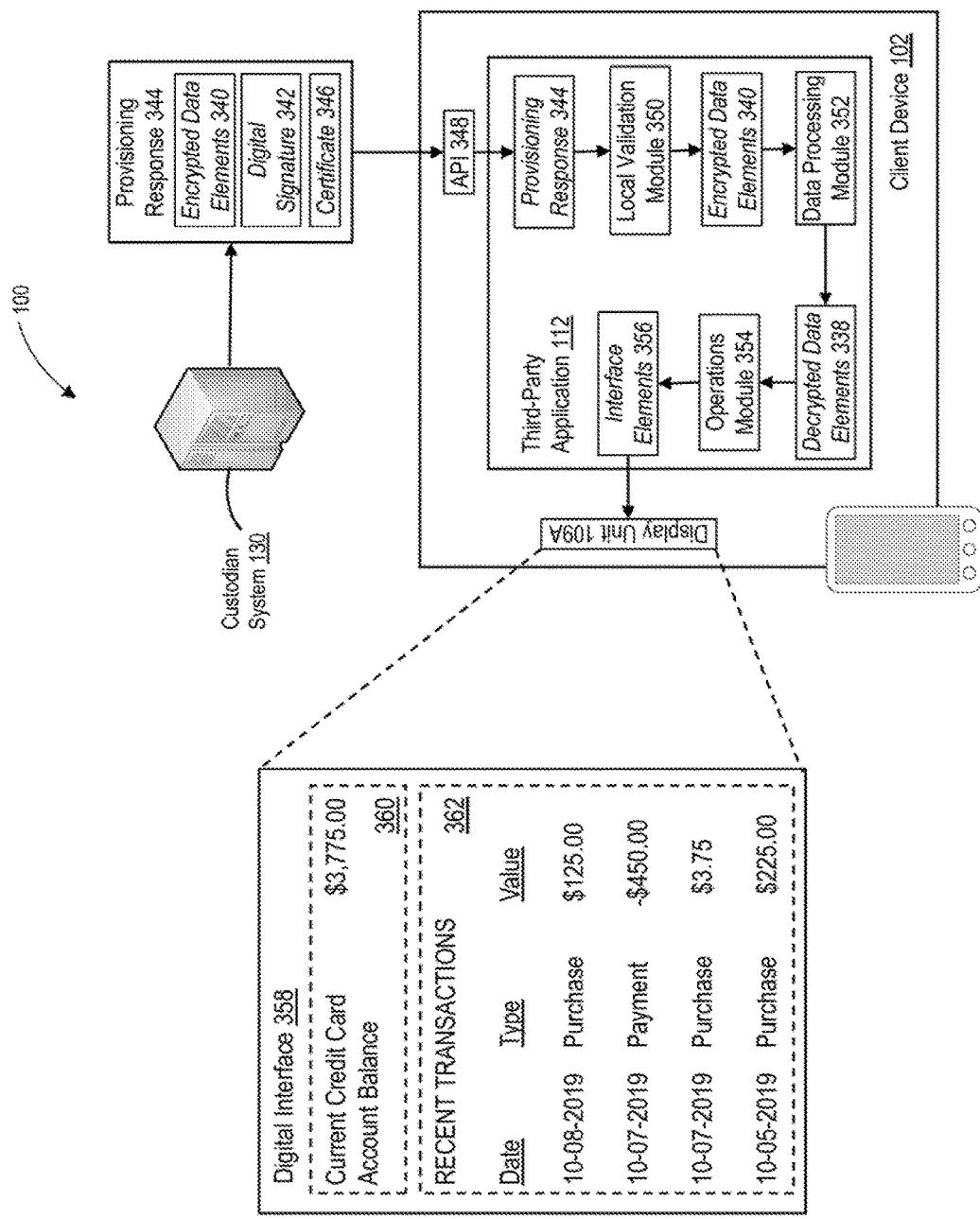

FIGS. 3A and 3B illustrate additional portions of computing environment 100, in accordance with disclosed exemplary embodiments. Referring to FIG. 3A, and upon execution by processor 104 of client device 102, one or more application modules of third-party application 106, such as request management module 302, may generate a request 304 to access one or more elements of confidential data maintained on behalf of user 101 by one or more network-connected computing systems within environment 100, such as the elements of confidential profile, account, and transaction data maintained by custodian system 130. By way of example, request 304 may correspond to a request, generated by executed third-party application 106, to access a current account balance of a credit card account held by user 101 and data characterizing a specified number of recent purchase transactions involving that credit card account, e.g., the thirty most-recent purchase transactions involving the credit card account.

In some instances, request 304 may include a data identifier 306 for each of the requested elements of confidential data e.g., unique identifiers of the requested elements of account data and transaction data maintained by custodian system 130. Request 304 may also include OAuth token, which indicates an authentication of an identity of user 101 by custodian system 130, and an authorization of third-party application 106 to access not only one or more programmatic interfaces established and maintained by custodian system 130, but also elements of confidential profile, account, and transaction data maintained by custodian system 130 in accordance with the level of access previously granted by user 101. As described herein, however, OAuth token 308 alone fails to provide custodian system 130 within any indication that a subsequent use, management, or distribution of the accessed elements of confidential data by third-party application 106 will comport with the level of access previously granted third-party application 106 by user 101.

In some exemplary embodiments, client device 102 may also maintain, within local credential data store 108, an application-specific credential, e.g., application-specific credential 240, indicative of a determined likelihood that the subsequent use, management, or distribution of the accessed elements of confidential data by third-party application 106 will comport with the level of access previously granted by user 101, and as such, a determination that the financial institution associated with custodian system 130 may "trust" third-party application 106 to use, manage, and distribute the accessed elements of confidential data. Examples of application-specific credential 240 include, but are not limited to, a digital token, a cryptogram, a hash value, or a random number, or another element of cryptographic or non-cryptographic data having a structure or a formal recognizable by the custodian systems operating within environment 100, such as custodian systems 110 and 130. Further, application-specific credential 240 may be generated by, and provisioned to client device 102, by CA system 150 through any of the exemplary processes described herein.

Referring back to FIG. 3A, executed request management module 302 may perform operations that identify and extract, from local credential data store 108, application-specific credential 240, and may package application-specific credential 240 within a corresponding portion of request 304. In some instances, executed request management module 302 may also perform operations that that package, within corresponding portions of request 304, a unique identifier 310A of executed third-party application 106 (e.g., a unique cryptogram, hash value, or other element of cryptographic data, etc.) and a unique identifier 310B of client device 102 (e.g., an IP address etc.). Executed request management module 302 may further apply a digital signature 312 to all or a portion of request 304, e.g., using a private cryptographic key of third-party application 106, and may perform operations that cause client device 102 to broadcast request 304, applied digital signature 312, and a public key certificate 314 of third-party application 106 (e.g., that includes a corresponding public cryptographic key) across network 120 to custodian system 130.

A secure, programmatic interface established and maintained by custodian system 130, such as application programming interface (API) 316, may receive request 304, and may route request 304, applied digital signature 312, and public key certificate 314 to consent and permissioning engine 142, e.g., as executed by custodian system 130. In some instances, and prior to routing request 304 to executed consent and permissioning engine 142, API 316 may perform operations (not illustrated in FIG. 3A) that parse request 304, extract OAuth token 308, and perform an initial pre-validation process that determines whether a format or structure of OAuth token 308 conforms with an expected token format or structure, e.g., associated with the exemplary decoupled authentication and consent protocols described herein.

If, for example, API 316 were to establish an inconsistency between the format or structure of OAuth token 308 and the expected token structure or format, API 316 may determine that OAuth token 308 is not valid for the requested access to the confidential data maintained at custodian system 130. Based on the established inconsistency, API 316 may discard request 304, and custodian system 130 may perform operations that generate and transmit an error message across network 120 to client device 102 (not illustrated in FIG. 3A).

In other instances, if API 316 were to establish a consistency between the format or structure of OAuth token 308 and the expected token format or structure, API 316 may route request 304, applied digital signature 312, and public key certificate 314 to executed consent and permissioning engine 142. For example, a validation module 320 of executed consent and permissioning engine 142 may receive request 304, applied digital signature 312, and public key certificate 314, and may perform operations that validate applied digital signature 312 based on a public cryptographic key of third-party application 106, e.g., as extracted from public key certificate 314. Responsive to an unsuccessful validation of digital signature 312, validation module 320 may discard request 304. Validation module 320 may also generate an error message, which custodian system 130 may transmit across network 120 to client device 102 (not illustrated in FIG. 3A).

In other instances, and responsive to a successful validation of digital signature 312, validation module 320 may perform operations that route request 304 to a consent verification module 322 of executed consent and permissioning engine 122. For example, consent verification module 322 may perform operations that parse request 304 to extract OAuth token 308 and identifier 310A of third-party application 106, and may perform operations that validate OAuth token 308. As illustrated in FIG. 3A, consent verification module 322 may access credential data store 138 (e.g., as maintained within data repository 132), and obtain a reference version of the OAuth token, e.g., OAuth token 324, that is associated with or linked to identifier 310A within credential data store 138 and as such, is associated with third-party application 106.

Consent verification module 322 may perform additional operations that validate OAuth token 308 based on a comparison with, and a determined consistency with, OAuth token 324. For example, if executed consent verification module 322 were to detect an inconsistency between OAuth token 308 (e.g., as received from executed third-party application 106) and OAuth token 324 (e.g., as maintained within credential data store 138), consent verification module 322 may decline to validate OAuth token 308, and executed consent and permissioning engine 12 may reject request 304 and may perform operations that generate an error message, which custodian system 130 may transmit across network 120 to client device 102, (not illustrated in FIG. 3A).

In other instances, if consent verification module 322 were to determine that OAuth token 308 corresponds to or matches OAuth token 324, consent verification module 322 may validate OAuth token 308. As illustrated in FIG. 3A, consent verification module 322 may route request 304 to a trust verification module 326 of executed consent and permissioning engine 142, which may perform any of the exemplary processes described herein to validate application-specific credential 240 and as such, determine whether third-party application 106 and the centralized authority each attest to a common, determined likelihood that the subsequent use, management, or distribution of the accessed elements of confidential data by third-party application 106 will comport with the level of access previously granted by user 101.

For example, trust verification module 326 may parse request 304 and extract application-specific credential 240 and identifier 310A of executed third-party application 106, and may perform operations that validate application-specific credential 240. As illustrated in FIG. 3A, trust verification module 326 may perform operations that access a local copy of distributed ledger 170 (e.g., as maintained within data repository 132), and parse credential ledger blocks 176 to identify an element 328 of credential data that includes, or references, identifier 310A of executed third-party application 106. In some instances, trust verification module 326 may identify, within credential ledger blocks 176, multiple elements of credential data that include or reference identifier 310A, and trust verification module 326 may identify a most temporally recent one of these multiple elements of credential data as credential data element 328.

Trust verification module 326 may further parse credential data element 328 to extract a reference version of the application-specific credential associated with third-party application 106, e.g., application-specific credential 330. In some instances, trust verification module may 322 may also parse credential data element 328 to identify a presence, or alternatively, an absence, of additional data that limits or restricts a validity of application-specific credential 330, such as, but not limited to, revocation data (e.g., a flag) indicative of a permanent or temporary revocation of application-specific credential 330 by the centralized authority. By way of example, and through a performance of any of the exemplary processes described herein, the one or more CA computing systems within environment 100, include CA system 150, may record the additional data within credential ledger blocks of distributed ledger 170 based on a determined increase in the likelihood that third-party application 106 will misuse, mismanage, or improperly distribute accessed elements of confidential data.

If trust verification module 326 were to detect an absence of the additional data within credential data element 328, trust verification module 326 may perform further operations that validate application-specific credential 240 based on a comparison with, and a determined consistency with, reference application-specific credential 330. For instance, if executed trust verification module 326 were to detect an inconsistency between application-specific credential 240 (e.g., as received from executed third-party application 106) and application-specific credential 330 (e.g., as maintained within credential ledger blocks 176 of distributed ledger 170), trust verification module 326 may decline to validate application-specific credential 240, and executed consent and permissioning engine 142 may reject request 304 and may perform operations that generate an error message, which custodian system 130 may transmit across network 120 to client device 102, (not illustrated in FIG. 3A).

In other examples, if trust verification module 326 were to determine that application-specific credential 240 corresponds to or matches application-specific credential 330, trust verification module 326 may validate both application-specific credential 240 and request 304, and as such, may establish that both third-party application 106 and the centralized authority each attest to a common, determined likelihood that a future use, management, or distribution of the accessed elements of confidential data by third-party application 106 will comport with the level of access previously granted by user 101 (e.g., that the financial institution associated with custodian system 130 may "trust" third-party application 106). Trust verification module 326 may generate one or more elements of confirmation data 332, which confirm the successful verification of application-specific credential 240, and may parse request 304 to extract data identifiers 306 that uniquely identify each of the requested elements of confidential data, and identifier 310B of client device 102. Trust verification module 326 may perform additional operations that package confirmation data 332, data identifiers 306, and identifier 310b into corresponding portions of verification output 334, which trust verification module 326 may provide an input to a provisioning module 336 executed by custodian system 130.

In other examples, not illustrated in FIG. 3A, trust verification module 326 may detect, within credential data element 328, a presence of the additional data indicative of the limitation or restriction on the validity of application-specific credential 330. For instance, trust verification module 326 may parse the additional data and extract a data flag indicative of a permanent revocation of application-specific credential 330 by the centralized authority (e.g., which indicates an expectation by the centralized authority that third-party application 106 will misuse, mismanage, or improperly distribute accessed elements of confidential data). Based on the extracted data flag and the indicated permanent revocation, trust verification module 326 may decline to validate application-specific credential 240, and executed consent and permissioning engine 142 may reject request 304 and may perform operations that generate and transmit an error message to client device 102, (not illustrated in FIG. 3A).

In other instances, also not illustrated in FIG. 3A, trust verification module 326 may parse the additional data and extract a data flag indicative of a temporary revocation of application-specific credential 330 by the centralized authority, and may further temporal data identifying temporal interval during the revocation of application-specific credential 330 stands effective. Based on a determination that the temporary revocation remains effective (e.g., that a current time or data falls within the temporal interval), trust verification module 326 may decline to validate application-specific credential 240, and executed consent and permissioning engine 142 may reject request 304 and may perform operations that generate and transmit an error message to client device 102, (not illustrated in FIG. 3A). Alternatively, based on a determined expiration of the temporary revocation (e.g., that a current time or data falls subsequent to the temporal interval), trust verification module 326 may validate application-specific credential 240 based on a comparison with, and a determined consistency with, reference application-specific credential 330, and may generate verification output 334 based on an outcome of these validation processes.

Referring back to FIG. 3A, and upon execution by custodian system 130, provisioning module 336 may receive verification output 334, which includes confirmation data 332, data identifiers 306, and identifier 310B, and may parse confirmation data 332 to confirm the successful validation of OAuth token 308 and of application-specific credential 240. Based on the confirmation, executed provisioning module 336 may access confidential data store 136, and identify and extract elements 338 of confidential data that correspond to data identifiers 306. For example, confidential data elements 338 may include, among other things, the current account balance of the credit card account held by user 101 (e.g., a balance of $3,775.00), and the elements of transaction data that specify the transaction dates and values of the thirty, most-recent purchase transactions involving the credit card account. Further, executed provisioning module 336 may encrypt confidential data elements 338 using, for example, public cryptographic key 242A of third-party application 106 (e.g., as maintained within credential data store 138), and may output elements of encrypted confidential data 340. Executed provisioning module 336 may also apply a digital signature 342 to the elements of encrypted confidential data 340, e.g., using any appropriate digital signature algorithm in conjunction with a private cryptographic key of custodian system 130.

Executed provisioning module 336 may package the elements of encrypted confidential data 340 into corresponding portions of a response to request 304, e.g., provisioning response 344, along with digital signature 342 and a public key certificate 346 of custodian system 130 (e.g., that includes a corresponding public cryptographic key). In some instances, executed provisioning module 336 may perform operations that cause custodian system 130 to transmit provisioning response 344 across network 120 to client device 102 using any appropriate communications protocol, e.g., via the corresponding communications interface, such as the transceiver device.

Referring to FIG. 3B, API 348 of executed third-party application 106 may receive provisioning response 344, and may route provisioning response 344 to a local validation module 350 of executed third-party application 106. In some instances, local validation module 350 may parse provisioning response 344 to extract digital signature 342 and public key certificate 346, and may perform operations that validate digital signature 342 based on the public cryptographic key of custodian system 130 included within public key certificate 346. If, for example, local validation module 350 were unable to validate digital signature 342, local validation module 350 may discard provisioning response 344 and await additional provisioning response generated and transmitted by custodian system 130 (not illustrated in FIG. 3B).

In other examples, and based on a successful validation of digital signature 342, local validation module 350 may provide the elements of encrypted confidential data 340 as an input to a data processing module 352 of executed third-party application 106. Executed data processing module 352 may also access private cryptographic key 242B of third-party application 106 (e.g., as maintained within local credential data store 108) and may decrypt the elements of encrypted confidential data 340, e.g., to generate decrypted elements 338 of confidential data. Executed data processing module 352 may route decrypted elements 338 of confidential data to an operations module 354 of executed third-party application 106, which may perform one or more operations on decrypted elements 338 of confidential data.

The one or more operations may include, among other things, processes that aggregate, transform, or modify certain of the decrypted elements 338 of confidential data, or that present all or a portion of the decrypted elements 338 of confidential data within a corresponding digital interface. As illustrated in FIG. 3B, executed operations module 354 may perform operations that generate one or more interface elements 356 that provide a graphical or textual representation of corresponding ones of decrypted elements 338 of confidential data. Operations module 354 may route each of generated interface elements 356 to display unit 109A of client device 102, which may render generated interface elements 356 for presentation within digital interface 358. For example, digital interface 358 may include interface element 360, which when rendered for presentation, identifies a current account balance of $3,775.00 for the credit card account held by user 101. Further, digital interface 358 may also include additional interface elements 362, which when rendered for presentation, identify the transaction dates and transaction values of at least a portion of the thirty, most-recent transactions involving the credit card account of user 101.

As described herein, the generation and assignment of application-specific credential 240 to third-party application 106 by CA system 150, and the recordation of application-specific credential 240 within credential ledger blocks 176 of distributed ledger 170 by the collective operations of each of the CA systems within environment 100, may reflect an initial determination by the centralized authority that third-party application 106 is likely to use, manage, and distribute accessed elements of confidential data in accordance with a level of access previously granted by user 101 and further, in accordance with one or more limitations imposed by the financial institutions within a trusted, open-banking network. In some instances, however, a subsequent use, management, or distribution of the accessed elements of confidential data may deviate from the previously granted level of access, or may violate or exceed the imposed limitations, either inadvertently or by deliberate action (e.g., a malicious party intercepting confidential data, an inadvertent distribution of confidential data to unauthorized parties, etc.).

In other instances, a determined change in a standing of the third-party entity associated with third-party application 106 before a governmental, regulatory, or judicial entity may be indicative of a lack of trustworthiness (e.g., the corporate registration of the third-party entity may lapse, the third-party entity may owe back taxes, the third-party entity may be subject to one or more judicial orders, etc.). Based on the subsequent use, management, or distribution of the accessed elements of confidential data by third-party application 106, or based on a determined change in the standing of the third-party entity, certain of the exemplary processes described herein may enable one or more of the CA systems described herein, such as CA system 150, to perform operations that modify or revoke, on a permanent or temporary basis, an ability of the third-party application to access elements of confidential data maintained by the custodian system operating within environment 100 without invalidating the OAuth tokens indicative of the successful implementation of the existing token-based authentication and consent process (e.g., the OAuth protocol) between third-party application 106 and these custodian systems.

Figure 4A:
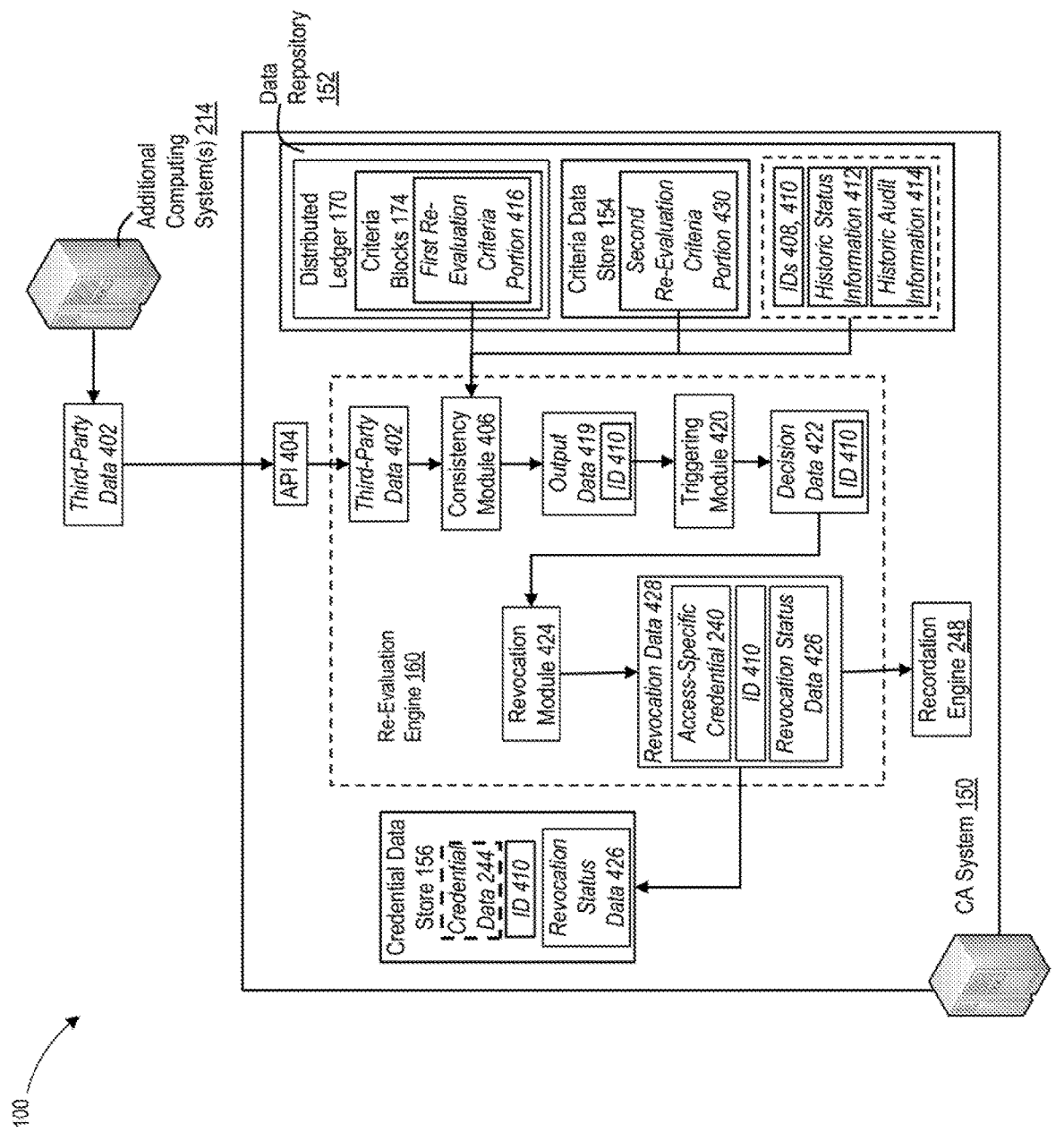

Referring to FIG. 4A, an application program executed by one or more of the CA systems operating within environment 100, such as re-evaluation engine 160 executed by CA system 150, may establish a secure channel of communications with additional computing systems 214. As described herein, additional computing systems 214 may include, but are not limited to, computing systems maintained by one or more governmental, judicial, or legal entities, or a computing system maintained by an external auditor that monitors an access and management of confidential data by other third-party applications developed by the third-party entity.

In some instances, additional computing systems 214 may perform operations that transmit elements of third-party 402 across network 120 to CA system 150 and additionally, or alternatively, to other CA systems operating within environment 100. For example, additional computing systems 214 may generate and transmit portions of third-party data 402 across network 120 to CA system 150 at regular, predetermined intervals (e.g., on a daily or a monthly basis) or as continuous, streamed content. In other examples, additional computing systems 214 may perform operations that transmit additional portions of third-party data 402 to CA system 150 in response to a request generated and transmitted by executed re-evaluation engine 160.

Third-party data 402 may, for example, include discrete elements of standing or audit information that not only characterize third-party application 106, but also characterize the third-party entity associated with third-party application 106 and third-party system 180. For instance, standing information included within third-party data 402 may include, among other things data, that identifies a reference address associated with the third-party entity, a reference jurisdiction of incorporation, and/or a time during which the third-party entity was incorporated within the reference jurisdiction (e.g., as maintained within the one or more governmental data repositories of additional computing systems 214). The elements of standing information may also include data the identifies an existence or an absence of a tax lien imposed upon the third-party entity or of a judicial holding against the third-party entity (e.g., as maintained within the one or more governmental or judicial data repositories of additional computing systems 214), and additionally, or alternatively, data that identifies one or more licenses currently or previously held by the third-party entity or one or disciplinary actions imposed on the third-party entity by a regulatory (e.g., as maintained within the one or more regulatory data repositories of additional computing systems 214).

The audit information included within third-party data 402 may include, among other things, data that identifies one or more detected instances of mismanagement of confidential information by third-party application 106, third-party system 180, or other third-party applications developed by the third-party entity (e.g., as maintained within the one or more audit data repositories of additional computing systems 214). In some instances, the audit information may also include data that identifies one or more complaints alleging that that third-party application 106, third-party system 180, or other third-party applications developed by the third-party entity mismanaged confidential information, e.g., by not adequately protecting, and prohibiting access to, the confidential information (e.g., as further maintained within the one or more audit data repositories). The disclosed embodiments are, however, not limited to these examples of standing and audit information, and in other instances, the elements of standing or audit information may include any additional or alternate information associated with the third-party entity, third-party systems 180, or third-party application 106 and maintained within governmental, judicial, regulatory, or audit data repositories accessible to additional computing systems 214.

Referring back to FIG. 4A, a secure, programmatic interface established and maintained by CA system 150, such as application programming interface (API) 404, may receive third-party data 404 and may route third-party data 404 to executed re-evaluation engine 160. In some examples, executed re-evaluation engine 160 may perform any of the exemplary processes described herein to re-evaluate whether third-party application 106 should be trusted to access and manage confidential data maintained by the one or more custodian systems operating within environment 100, e.g., based on an application of a plurality of additional data access criteria (e.g., "re-evaluation" criteria) to corresponding portions of third-party data 404, either alone or in conjunction with additional information characterizing a standing of the third-party entity or an audit status of the third-party entity, third-party system 180, or third-party application 106 during one or more prior temporal intervals. As described herein, one or more of the re-evaluation criteria may be specified by the financial institutions that are associated with, or that operate, the custodian systems within environment 100, such as the financial institutions associated with custodian systems 110 and 130. In other instances, additional ones of the re-evaluation criteria may be specified by at least one of a judicial entity, a regulatory entity, or a governmental entity that monitor these financial institutions.

In some examples, a consistency module 406 of executed centralized on-boarding engine 158 may receive third-party data 402, and may perform operations that, based on third-party data 402, obtain an identifier 408 of the third-party entity, and an identifier 410 of third-party application 106. Based on identifiers 408 and 410, consistency module 406 may access a data repository locally maintained by CA system 150, e.g., data repository 152, and access historic standing information 412 and historic audit information 414 characterizing respective ones of a standing or audit status of the third-party entity, third-party system 180, and/or third-party application 106 over one or more prior temporal intervals, In some instances, historic standing information 412 may include any of the elements of standing information described herein during one or more of the prior temporal intervals, and historic audit information 414 may include any of the elements of audit information described herein during the one or more of the prior temporal intervals. Further, and by way of example, CA system 150 may receive one or more of the elements of historic standing information 412 and historic audit information 414 from additional computing systems 214 during the prior temporal intervals, or may receive one or more elements of historic standing information 412 and historic audit information 414 from one or more of the custodian systems during any of the exemplary on-boarding processes described herein (e.g., third-party access request 218 of FIG. 2A).

Consistency module 406 may perform also operations that access and obtain each of the re-evaluation criteria and that establish an applicability of each of the re-evaluation criteria to discrete portions of third-party data 404, either alone or in conjunction with elements of historic standing information 412 and historic audit information 414 (e.g., to establish a change or variation in a standing or audit characteristic between the current and prior temporal intervals). In some examples, at least portion of the re-evaluation criteria may be recorded immutably within one or more ledger block of cryptographically secure distributed ledger 170, e.g., within criteria ledger blocks 174 of distributed ledger 170. As illustrated in FIG. 4A, consistency module 406 may identify and access distributed ledger 170, e.g., as maintained within data repository 152, and may perform operations that extract a first portion 416 of the on-boarding criteria from criteria ledger blocks 174. In other examples, one or more portions of the re-evaluation criteria may be locally maintained by CA system 150 within data repository 152, e.g., within criteria data store 154. As further illustrated in FIG. 4A, consistency module 406 may also access criteria data store 154 of data repository 152, and may perform operations that extract a second portion 418 of the re-evaluation criteria from criteria data store 154.

In some instances, the re-evaluation criteria (e.g., as included with extracted first portion 228 or extracted second portion 230) may specify at least one re-evaluation criterion that, when applicable to the discrete portions of third-party data 404, either alone or in conjunction with elements of historic standing information 412 and historic audit information 414, triggers a permanent revocation of application-specific credential 240 of third-party application 106. For example, the at least one re-evaluation criterion may trigger a permanent revocation of application-specific credential 240 when, among other things, the third-party entity remains unincorporated for a predetermined temporal interval or the third-party entity loses a governmental or regulatory license required to conduct business within its jurisdiction of incorporation. In other examples, the at least one re-evaluation criterion may trigger the permanent revocation of application-specific credential 240 when a number of non-compliant uses, managements, or distributions of confidential data by third-party application 106 exceeds a threshold number, or when third-party application 106 or third-party system 180 fail to comply with one or more data integrity and security protocols mandated by the centralized authority.

In other instances, the re-evaluation criteria (e.g., as included with extracted first portion 228 or extracted second portion 230) may also specify at least one further re-evaluation criterion that, when applicable to the discrete portions of third-party data 404, either alone or in conjunction with elements of historic standing information 412 and historic audit information 414, triggers a temporary revocation of application-specific credential 240, e.g., during a predetermined revocation period. For example, the at least one further re-evaluation criterion may trigger a temporary revocation of the application-specific credential for third-party application 106 in response to an initial detected instance of a non-compliant use, management, or distribution confidential data, or in response to an initial detected issuance of a tax lien or other judicial holding against the third-party entity. The disclosed embodiments are not limited to these examples of re-evaluation conditions, and in other instances, the re-evaluation criteria (e.g., as included with extracted first portion 228 or extracted second portion 230) may include any additional or alternate criterion that, when applicable to the discrete portions of third-party data 404, historic standing information 412, and/or historic audit information 414, results in permanent or temporary revocation of the ability of third-party application 106 to access confidential data, e.g., as specified by the financial institutions associated with the custodian systems that operate within environment 100.

Referring back to FIG. 4A, consistency module 406 may perform operations that establish the applicability of the re-evaluation criteria within extracted first portion 416, and additionally or alternatively, within extracted second portion 418, to the discrete portions of third-party data 404, either alone or in conjunction with elements of historic standing information 412 and historic audit information 414. Consistency module 406 may also generate one or an element of output data 419 for each of the re-evaluation criteria that specifies an applicability, or alternatively, an inapplicability, the corresponding one of the re-evaluation criteria to third-party data 404, either alone or in conjunction with the elements of historic standing information 412 and historic audit information 414. For example, each of the elements of output data 419 may include a binary flag, the value of which may indicate the determined applicability (e.g., a value of unity) or determined inapplicability (e.g., a value of zero). The elements of output data 226 may also include data identifying corresponding ones of the re-evaluation criteria, and in some instances, for a determined applicability, additional data that specifies a source of the determined applicability (e.g., a lapsed incorporation, at least the threshold number of detected misuses, etc.). Further, consistency module 406 may also package identifier 410 of third-party application 106 into a corresponding portion of output data 419.

Consistency module 406 may provide output data 419 as an input to a triggering module 420 of executed re-evaluation engine 160. In some instances, triggering module 420 may perform any of the exemplary processes described herein that determine whether the application of the re-evaluation criteria to the elements of third-party data 404, historic standing information 412, and/or historic audit information 414 triggers a revocation of the application-specific credential associated with third-party application 106, either on a temporary or a permanent basis.

For example, triggering module 420 may parse output data 419 and determine that each, or at least a predetermined threshold number or subset, of the re-evaluation criteria are inapplicable to the elements of third-party data 404, historic standing information 412, and/or historic audit information 414. Based on the determination, triggering module 420 may establish that the application of re-evaluation criteria to the elements of third-party data 404, historic standing information 412, and/or historic audit information 414 fails to trigger any re-evaluation or revocation of application-specific credential 240 associated with third-party application 106. In some instances, executed re-evaluation engine 160 may perform further operations that store the elements of third-party data 404 within a corresponding portion of data repository 152 associated with identifier 410, e.g., as additional portions of historic standing information 412 or historic audit information 414, and may await a receipt of further data from additional computing systems 214.

In other examples, and based on output data 419, triggering module 420 may determine that the application of at least one of the re-evaluation criteria to the elements of third-party data 404, historic standing information 412, and/or historic audit information 414 triggers a permanent revocation of the application-specific credential associated with third-party application 106. Triggering module 420 may generate one or more elements of decision data 422 that identify the triggered revocation and specify the permanent status of that revocation. Alternatively, and in some examples, triggering module 420 may determine that the application of at least one of the re-evaluation criteria to the elements of third-party data 404, historic standing information 412, and/or historic audit information 414 triggers a temporary revocation of the application-specific credential associated with third-party application 106. Triggering module 420 may generate one or more elements of decision data 422 that identify the triggered revocation and specify the temporary status of that revocation, and that further include temporal data specify a duration of that temporary revocation.

Triggering module 420 may also perform operations that package identifier 410 of third-party application 106 into a corresponding portion of decision data 422, and that provide decision data 422 as an input to a revocation module 424 of executed re-evaluation engine 160. In some instances, revocation module 424 may parse decision data 422 to extract identifier 410 of third-party application 106. Revocation module 424 may also access a local copy of distributed ledger 170 (e.g., as maintained within data repository 152), and parse credential ledger blocks 176 to identify credential data 244 that includes, or references, identifier 410, and to extract application-specific credential 240 associated with third-party application 106 from credential data 244.

As illustrated in FIG. 4A, revocation module 424 may further parse decision data 422 to identify and characterize the status of the triggered revocation (e.g., permanent or temporary), and may generate revocation status data 426 indicative of the status of the triggered revocation. In some instances, for a triggered permanent revocation of application-specific credential 240, revocation status data 426 may include a data flag having a value of the triggered permanent revocation (e.g., a value of zero). In other instances, for a triggered temporary revocation of application-specific credential 240, revocation status data 426 may include an additional data flag having a value of indicative of the triggered temporary revocation (e.g., a value of unity), along with the temporal data specify the duration of that temporary revocation.

In additional, or alternate, examples, revocation module 424 may access credential data store 156, and identify a locally maintained copy of credential data 244 that includes or references identifier 410. Based on the triggered temporary or permanent revocation of application-specific credential 240, revocation module 424 may perform operations that store revocation status data 426 within credential data store 156 in conjunction with credential data 244 and identifier 410, e.g., to specify the permanent or temporary revocation. In other instances, and based on a triggered permanent revocation of application-specific credential 240, revocation module 424 may perform further operations that delete credential data 244 from credential data store 156.

Revocation module 424 may also perform operations that package application-specific credential 240, revocation status data 426, and identifier 410 into corresponding portions of revocation data 428, which revocation module 424 may provide as an input to recordation engine 248 of CA system 150. When executed by the one or more processors of CA system 150, recordation engine 248 may perform operations that cause CA system 150 to broadcast revocation data 428 across network 120 to each of the additional CA systems operating within environment 100, which facilitates a performance of consensus-based operations that, among other things, record revocation data 428 within an additional ledger block and broadcast an updated version of distributed ledger 170, that includes the additional ledger block, among the CA systems and custodian systems within environment 100.

Figure 4B:
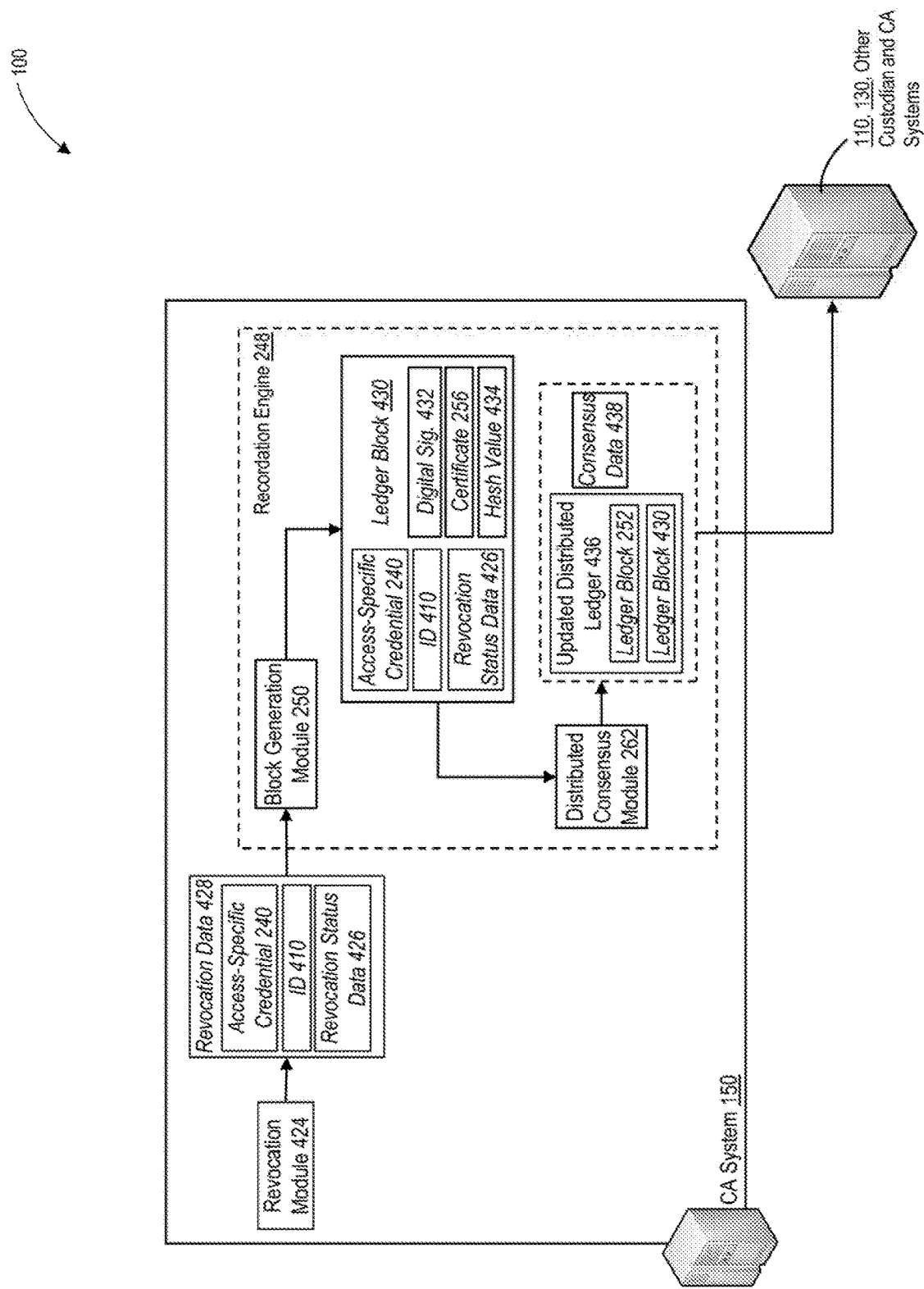

Referring to FIG. 4B, and to facilitate a performance of these consensus-based processes at CA system 150, a block generation module 250 of executed recordation engine 248 may perform operations that generate a new ledger block 430 that permanently- or temporarily revoked application-specific credential 240, identifier 410 of third-party application 106, and revocation status data 426. Further, block generation module 250 may also perform operations that, using a private cryptographic key of the centralized authority, generate and apply a digital signature 432 to application-specific credential 240, identifier 410, and revocation status data 426, and may package digital signature 432 into a corresponding portions of a ledger block 430, along with public key certificate 256 of centralized authority (e.g., that includes a corresponding public cryptographic key). Further, block generation module 250 may also compute a hash value 434 representative of application-specific credential 240, identifier 410, revocation status data 426, and in some instances, digital signature 432 (e.g., using an appropriate cryptographic or non-cryptographic hash function), and may package hash value 434 into a corresponding portion of ledger block 430.

CA system 150 (and each additional or alternate one of the CA systems of environment 100) may perform additional operations that append to ledger block 430 to a prior version of distributed ledger 170 to generate a latest, longest version of the distributed ledger (e.g., an updated distributed ledger 436 that includes ledger blocks 252 and 430). For example, the additional operations may be established through a distributed consensus among additional ones of the CA systems, and may include, but are not limited to, the calculation of an appropriate proof-of-work or proof-of-stake by a distributed consensus module 262 of executed recordation engine 248 prior to the other CA systems within environment 100. In certain aspects, CA system 150 may broadcast evidence of the calculated proof-of-work or proof-of-stake to the additional ones of the CA systems of environment 100 across network 120 (e.g., as consensus data 438).

CA system 150 may also broadcast updated distributed ledger 436, which represents the latest, longest version of the distributed ledger, to the additional ones of the CA systems of environment 100 and additionally or alternatively, to each of the custodian systems operating within environment 100, including custodian systems 110 and 130, e.g., through a secure, programmatic interface. In some instances, not illustrated in FIG. 2B, custodian systems 110 and 130 may perform operations that store updated distributed ledger 436 within a portion of respective ones of data repositories 112 and 132, e.g., to replace corresponding ones of distributed ledger 170, and to indicate the permanent or temporary revocation of application-specific credential 240.

Figure 5:
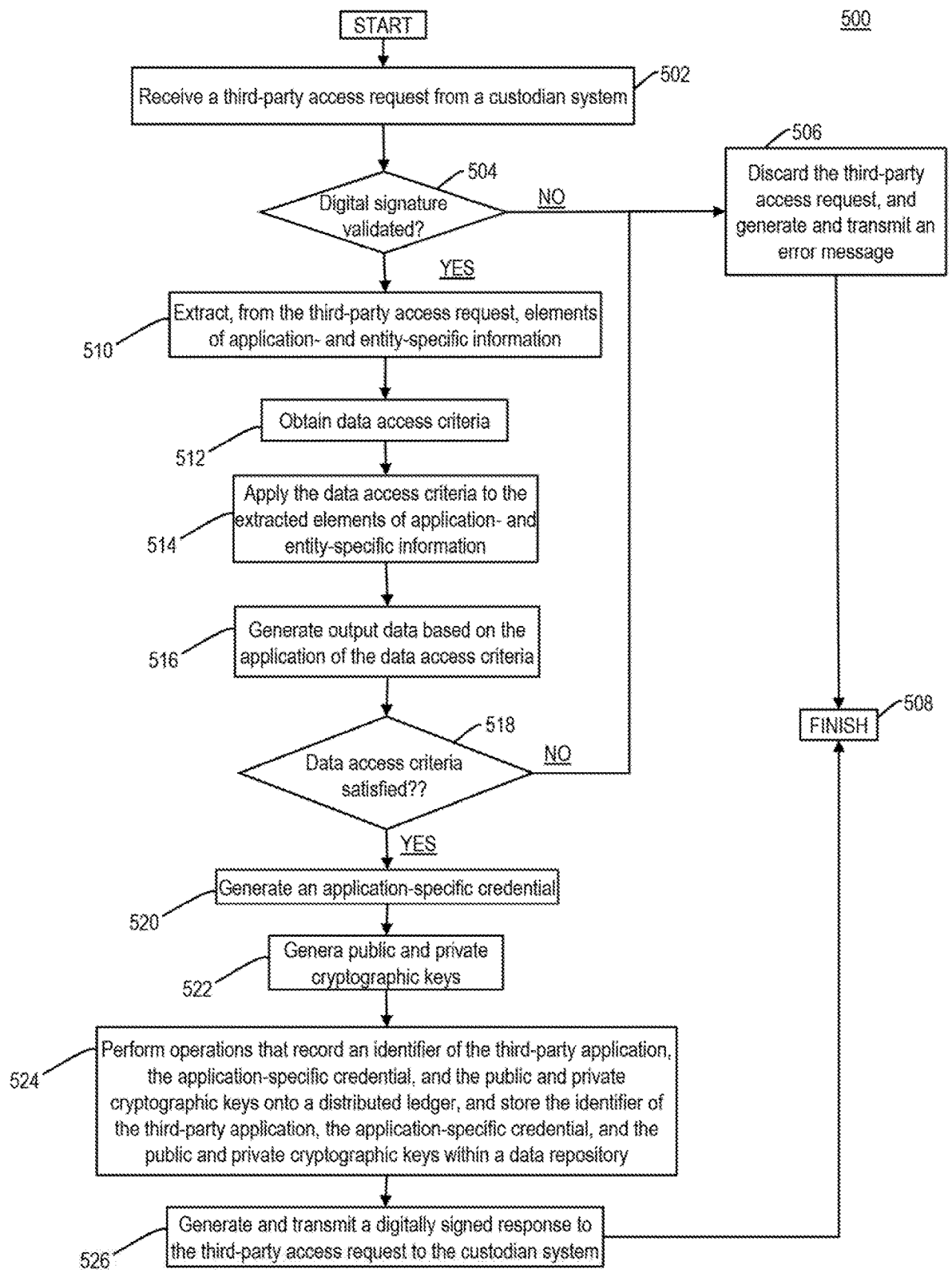
FIGS. 5-7 are flowcharts of exemplary processes for dynamically managing consent and permissioning between computing systems and unrelated third-party applications within a computing environment, in accordance with some embodiments.

FIG. 5 is a flowchart of an exemplary process 500 for dynamically establishing and managing trust, consent, and permissioning between computing systems and unrelated third-party applications within a computing environment, in accordance with disclosed exemplary embodiments. In some instances, one or more computing systems associated or operated by centralized authority, such as CA system 150 of FIG. 1, may perform one or more steps of exemplary process 500, which, among other things, may determine a likelihood that future use, management, or distribution of accessed elements of confidential data by a third-party application, such as third-party application 106 of FIG. 1, will comport with a previously granted level of user consent and with one or more limitations imposed by custodians of the confidential data, and may generate an application-specific credential indicative of that determined likelihood for provisioning to the custodians of the confidential data.

Referring to FIG. 5, CA system 150 may receive a third-party access request and an applied digital signature from a computing system associated with one or more of the custodians of the confidential data, such as custodian system 110 of FIG. 1 (e.g., in step 502). As described herein, custodian system 110 may be operated by a corresponding financial institution, and may maintain, within one or more data repositories, elements of confidential account, transaction, or customer profile data on behalf of various customers, such as, but not limited to, user 101. The received third-party access request may be associated with a third-party application (e.g., third-party application 106 of FIG. 1) that when executed by a corresponding device or system (e.g., client device 102 of FIG. 1), may perform operations that request one or more elements of confidential data maintained on behalf of user 101 at one or more of the custodian systems operating within environment 100 (e.g., custodian systems 110 and 130), and that perform various operations on the accessed elements of confidential data. Examples of third-party application 106 include, but are not limited to, a third-party financial aggregator application or a third-party financial management application.

In some instances, the received third-party access request may include elements of application- and entity-specific information, such as data that uniquely identifies third-party application 106 (e.g., an application cryptogram, an application name, etc.) and that uniquely identifies and characterizes a third-party entity associated with third-party application 106 (e.g., a name of the third-party entity, a current address of the third-party entity, a tax identification number of the third-party entity, and a jurisdiction in which the third-party entity is incorporated). The elements of application- and entity-specific information may also include any of the exemplary data described herein that characterizes an expected access, management, or usage of the elements of confidential data by third-party application 106, and one or more of the exemplary elements standing or audit data described herein.

Referring back to FIG. 5, CA system 150 may perform operations that validate the applied digital signature in step 504, e.g., based on a public cryptographic key associated with custodian system 110. If CA system 150 were unable to validate the applied digital signature (e.g., step 504; NO), CA system 150 may decline to on-board third-party application 106 into an open-banking environment that includes, among other things, at least a subset of the custodian systems operating within environment 100. CA system 150 may discard the received third-party access request, and may generate and transmit an error message across network 120 to custodian system 110 (e.g., in step 506). Exemplary process 500 is then complete in step 508.

Alternatively, if CA system 150 were to successful validate the applied digital signature (e.g., step 504; YES), CA system 150 may parse the received third-party access request and extract each of the elements of application- and entity-specific information (e.g., in step 510). Further, in step 512, CA system 150 may obtain data identifying and characterizing one or more of the exemplary data access criteria described herein, such as from a locally maintained copy of a distributed ledger (e.g., from criteria ledger blocks 174 of distributed ledger 170 of FIG. 1) or from a locally maintained data repository (e.g., from credential data store 156 of FIG. 1).

CA system 150 may further perform any of the exemplary processes described herein to apply each of the data access criteria to the extracted elements of application- and entity-specific data, and to determine whether the elements of application- and entity-specific data satisfy, and are consistent with, each of the data access criteria (e.g., in step 514). CA system 150 may also perform operation that generate, for each of the data access criteria, an element of output data indicative of a determined consistency, or a determined inconsistency, with the extracted elements of application- and entity-specific data (e.g., in step 516). For example, each of the elements of output data may include a binary flag, the value of which may indicate the determined consistency (e.g., a value of unity) or determined inconsistency (e.g., a value of zero), and may also include data identifying corresponding ones of the data access criteria, and in some instances, for a determined inconsistency, additional data that specifies a source of the determined inconsistency.

Based on the generated elements of output data, CA system 150 may determine whether the extracted elements of application- and entity-specific information satisfy each of, or at least a predetermined threshold portion of, the data access criteria (e.g., in step 518). In some instances, if CA system 150 were to determine that extracted elements of application- and entity-specific information fail to satisfy each of, or at least the predetermined threshold portion of, the data access criteria (e.g., step 518; NO), CA system 150 may determine that third-party application 106 is likely to misuse, mismanage, or improperly distribute accessed elements of confidential data during future temporal intervals, and as such, that third-party application 106 should not be on-boarded into the trusted, open-banking network. Based on this additional determination, exemplary process 500 may pass back to step 506, and CA system 150 may discard the received third-party access request, and may generate and transmit an error message to custodian system 110. Exemplary process 500 is then complete in step 508.

In other instances, if CA system 150 were to determine that the extracted elements of application- or entity-specific data satisfy each of, or at least the predetermined threshold portion of, the data access criteria (e.g., step 518; YES), CA system 150 may establish that a future use, management, or distribution of accessed elements of confidential data by third-party application 106 will likely comport with a level of access previously granted by user 101, and as such, that third-party application 106 should be trusted and on-boarded into the trusted, open-banking network. In step 520, CA system 150 may also perform any of the exemplary processes described herein to generate, for third-party application 106, an application-specific credential indicative of the established likelihood that the future use, management, or distribution of the accessed elements of confidential data will comport with the previously-granted level of access (and as such, that the financial institutions within the trusted, open-banking network should trust third-party application 106 to use, manage, and distribute elements of confidential data maintained at the custodian systems). Examples of application-specific credential 240 include, but are not limited to, a digital token, a cryptogram, a hash value, a random number, or another element of cryptographic or non-cryptographic data having a structure or a formal recognizable by the custodian systems operating within environment 100, such as custodian systems 110 and 130. CA system 150 may also generate a public and private cryptographic key pair for third-party application 106 (e.g., in step 522).

Furthermore, CA system 150 may also perform any of the exemplary, consensus-based processes described herein (e.g., individually, or in conjunction with the other CA systems operating within environment 100) to record an identifier of third-party application, the generated application-specific credential, and the generated public and private cryptographic key pair within one or more ledger blocks of a cryptographically secure distributed ledger, which may be accessible to custodian system 110, custodian system 130, and the other custodian systems operating within environment 100 (e.g., in step 524). In some instances, also in step 524, CA system 150 may perform operations that store the identifier of third-party application, the generated application-specific credential, and the generated public and private cryptographic keys within a locally accessible data repository, such as credential data store 156, which may be accessible to custodian system 110, custodian system 130, and other custodian systems operating within environment 100 through a corresponding programmatic interface.

In some instances, CA system 150 may also perform any of the exemplary processes described herein to generate a digitally signed response to the third-party access request, and to transmit the digitally signed response back to custodian system 110 (e.g., in step 526). The digitally signed response include the identifier of third-party application, the generated application-specific credential, and the generated public and private cryptographic key pair, and the digital signature may be generated and applied using a private cryptographic key of the centralized authority, as described herein. In some instances, custodian system 110 may receive the digitally signed response, and upon validation of the digital signature, may perform any of the exemplary processes described herein to provision the generated application-specific credential, and the generated public and private cryptographic keys to third-party application 106 and one or more computing systems associated with the third-party entity, e.g., third-party system 180 of FIG. 1. Exemplary process 500 is then complete in step 508.

Figure 6:
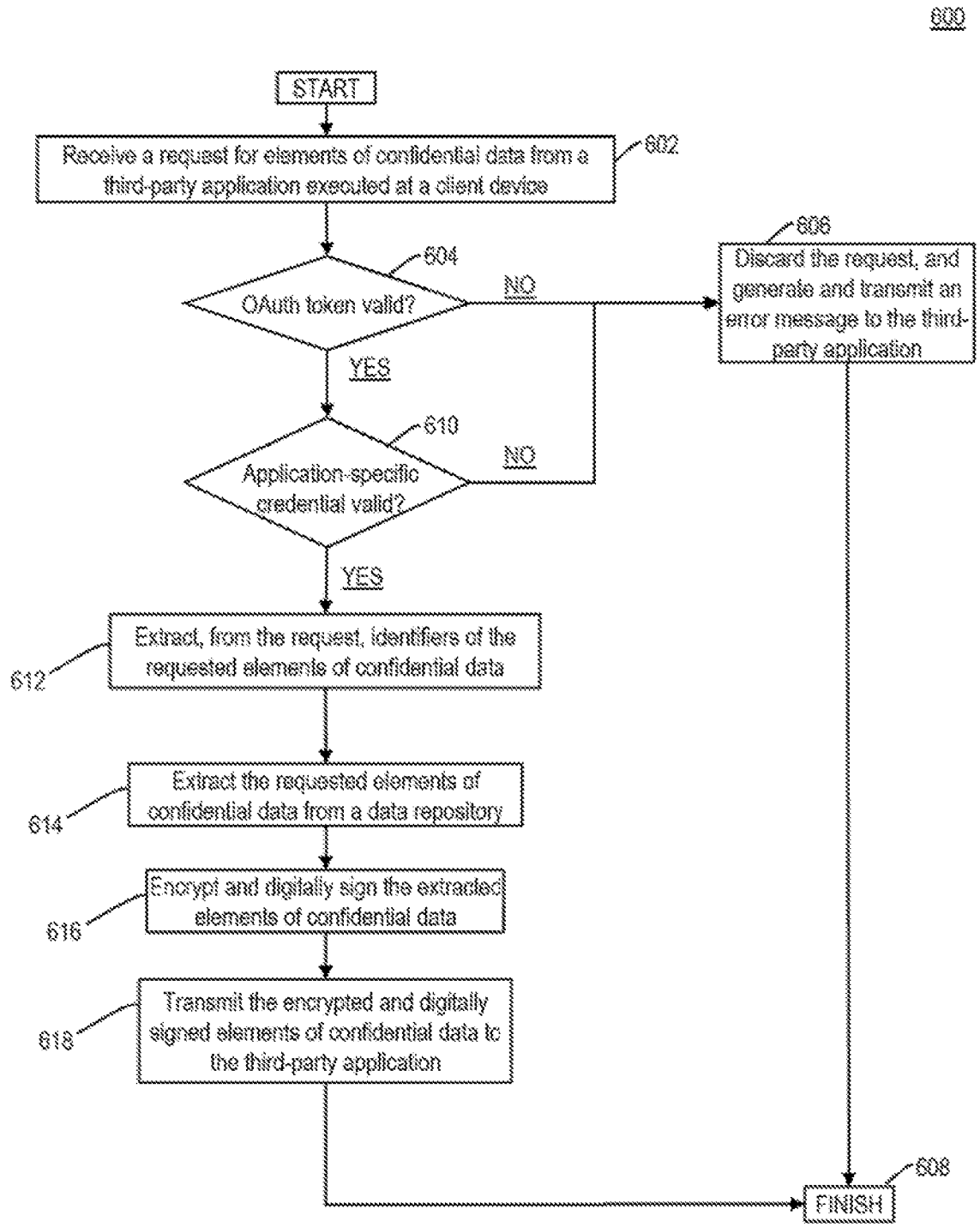

FIG. 6 is a flowchart of an exemplary process 600 for dynamically managing trust, consent, and permissioning between computing systems and unrelated third-party applications within a computing environment, in accordance with disclosed exemplary embodiments. In some instances, a network-connected computing system operating within environment 100 that maintained elements of confidential data, such as custodian system 130, may perform one or more of the steps of exemplary process 600. Further, and as described herein, custodian system 130 may perform one or more of the steps of exemplary process 600 based on data exchanged across a secure communications channel with a third-party application executed at a network-connected computing device or system, such as third-party application 106 executed at client device 102.

Referring to FIG. 6, custodian system 130 may receive, from client device 102 across network 120, a request for to access one or more elements of confidential data (e.g., in step 602). In some instances, the request may be generated by the third-party application executed at client device 102, such as third-party application 106, and the requested elements of confidential data may include one or more of the elements of confidential profile, account, and transaction data maintained by custodian system 130 on behalf of user 101 of client device 102.

The received request may, for example, include an identifier of each of the requested elements of confidential data, e.g., the requested elements of confidential profile, account, and transaction data. Further, in some instances, the received request may include an identifier of third-party application 106 (e.g., an application cryptogram, an application name, etc.) and application-specific credential associated, and assigned to, third-party application 106 by one or more of the CA computing systems operating within environment 100. For example, the application-specific credential may represent an attestation, by third-party application 106, of a determined likelihood that a future use, management, or distribution of accessed elements of confidential data will comport with a level of access previously granted by user 101. The application-specific credential may be generated, and provisioned to third-party application 106, by one or more of the CA systems operating within environment 100, such as CA system 150, using any of the exemplary processes described herein.

The received request may also include an OAuth token associated with executed third-party application 106. The OAuth token may, for example, be indicative of an authentication of an identity of user 101 by custodian system 130 and an authorization of the third-party application 106 to access one or more programmatic interfaces established and maintained by custodian system 130, and to access one or more elements of confidential data maintained on behalf of custodian system 130 in accordance with the previously granted level of access. As described herein, the OAuth token may be generated by, and provisioned to client device 102, by custodian system 130 based on a successful outcome of one or more of the existing token-based authorization and consent protocols described, e.g., an OAuth protocol.

In some instances, custodian system 130 may parse the request to extract the OAuth token associated with the third-party application 106, and may perform any of the exemplary processes described herein to validate the extracted OAuth token based on a determined consistency with a locally accessible reference OAuth token associated with the third-party application 106 (e.g., in step 604). For example, if custodian system 130 were to detect an inconsistency between the extracted and reference OAuth tokens, custodian system 130 may decline to validate the extracted OAuth token (step 604; NO), and custodian system 130 may decline to grant third-party application 106 access to the requested elements of confidential data and may discard the request (e.g., in step 606). Custodian system 130 may also perform operations that generate and transmit an error message across network 120 to client device 102 (e.g., also in step 606). Exemplary process 600 is then complete in step 608.

If, however, custodian system 130 were to establish a consistency between the extracted and reference OAuth tokens (step 604; YES), custodian system 130 may perform any of the exemplary processes described herein to validate the application-specific credential associated with third-party application 106 (e.g., in step 610). In some instances, custodian system 130 may perform operations that validate the application-specific credential based on a comparison with a reference copy of the application-specific credential generated by one of more of the CA system operating within environment 100. Through a comparison of the application-specific credential received from third-party application 106 and the reference copy of the application-specific credential, custodian system 130 may confirm that third-party application 106 and the centralized authority each attest to a common, determined likelihood that the future use, management, or distribution of accessed elements of confidential data by third-party application 106 will comport with the level of access previously granted by user 101.

For example, in step 610, custodian system 130 may access a local copy of a cryptographically secure distributed ledger 170 (e.g., distributed ledger 170, as maintained within data repository 132 of FIG. 1), and may perform any of the exemplary processes described herein to parse one or more ledger blocks of the accessed distributed ledger (e.g., credential ledger blocks 176 of FIG. 1), and identify and extract the reference copy of the application-specific credential based on its association with the identifier of the third-party application. Custodian system 130 may also obtain, from the parsed ledger blocks, one or more elements of additional data (e.g., revocation status data 426 of FIG. 4A) indicative of a permanent or temporary revocation of that reference copy of the application-specific credential.

Further, and as described herein, one or more of the CA systems operating within environment 100, such as CA system 150, may maintain the reference copy of the application-specific credential and any additional data indicative of the permanent or temporary revocation of that reference copy of the application-specific credential (e.g., within credential data store 156 of FIG. 1). In some examples, custodian system 130 may generate a credential request that includes the identifier of third-party application 106 and further data identifying custodian system 130 (e.g., a cryptogram, an IP address, etc.), and transmit the credential request across network 120 to a programmatic interface established and maintained by CA system 150. Responsive to a validation of the data identifying custodian system 130, CA system 150 may access credential data store 156, and identify and extract the reference copy of the application-specific credential and any additional data indicative of the permanent or temporary revocation of that reference copy, and transmit the extracted reference copy and the additional data across network 120 to custodian system 130, e.g., in response to the credential request.

In some examples, in step 610, custodian system 130 may perform operations that determine whether the application-specific credential received from third-party application 106 corresponds to or matches the reference copy of the application specific credential. For instance, if custodian system 130 were to detect an inconsistency between the received application-specific credential and the reference copy, custodian system 130 may decline to validate the received application-specific credential (step 610; NO), and custodian system 130 may decline to grant third-party application 106 access to the requested elements of confidential data and may discard the request (e.g., in step 606). Custodian system 130 may also perform operations that generate and transmit an error message to client device 102 (e.g., also in step 606). Exemplary process 600 is then complete in step 608.

Alternatively, if custodian system 130 were to establish a consistency between the received application-specific credential and the reference copy, custodian system 130 may perform further any of the exemplary processes described herein to determine whether the application-specific credential is subject to permanent or temporary revocation. For example, if custodian system 130 were to determine that, based on the additional data associated with the reference copy, the application-specific credential received from third-party application 106 is subject to permanent revocation, or to a pending temporal revocation, custodian system 130 may also decline to validate the received application-specific credential (step 610; NO), and custodian system 130 may decline to grant third-party application 106 access to the requested elements of confidential data and may discard the request (e.g., in step 606). Custodian system 130 may also perform operations that generate and transmit an error message to client device 102 (e.g., also in step 606). Exemplary process 600 is then complete in step 608.

In other examples, if custodian system 130 were unable to identify any additional data associated with the reference copy (and as such, were to determine that the application-specific credential is subject to neither a permanent nor a temporary restriction), or if custodian system 130 were to determine based on the additional data that the application-specific credential was subject to a now-expired temporary revocation, custodian system 130 may validate the received application-specific credential and grant third-party application 106 access to the requested elements of confidential data (e.g., step 610; YES). As described herein, and based on the validation of the received application-specific credential, custodian system 130 may confirm that third-party application 106 and the centralized authority each attest to the common, determined likelihood that the future use, management, or distribution of accessed elements of confidential data by third-party application 106 will comport with the level of access previously granted by user 101.

Additionally, in some exemplary embodiments, certain of the operations described herein, which validate the application-specific credential received from third-party application 106, may be performed by the one or more CA systems, including CA system 150, based on a consensus-based implementation of a distributed smart contract, e.g., based on executable code recorded immutable within contract ledger blocks 172 of distributed ledger 170. For example, in step 610, custodian system 130 may generate a validation request that includes the received application-specific credential, the identifier of third-party application 106, and a unique smart-contract identifier (e.g., an address of the distributed smart contract), and may broadcast the validation request across network 120 to the one or more CA systems operating within environment 100, including CA system 150.

In some instances, each of the one or more CA systems, including CA system 150, may receive the verification request, and may perform operations that parse the verification request to extract the smart-contract identifier. Based on the smart-contract identifier, each of the one or more CA systems may access contract ledger blocks 172 of distributed ledger 170, and perform consensus-based operations that execute the code within the application-specific credential to: (i) based on the identifier of third-party application 106, parse credential ledger blocks 176 to obtain the reference copy of the application-specific credential and any additional data indicative of the temporary or permanent revocation; (ii) extract the application-specific credential received within verification request; (iii) validate the received application-specific credential based a determined correspondence with the reference copy and based on the additional data, if present; and (iv) generate, and transmit to custodian system 130, consensus output data indicative of an outcome of the validation of the received application-specific credential, e.g., whether the received application-specific credential corresponds to, and matches, the reference copy, and whether the received application-specific credential is subject to the permanent or temporary revocation.

Although not illustrated in FIG. 6, custodian system 130 may receive the consensus output data from the one or more CA systems in step 610. If custodian system 130 were to establish the invalidity of the received application-specific credential based on the consensus output data (step 610; NO), custodian system 130 may decline to grant third-party application 106 access to the requested elements of confidential data and may discard the request (e.g., in step 606). Custodian system 130 may also perform operations that generate and transmit an error message to client device 102 (e.g., also in step 606). Exemplary process 600 is then complete in step 608. Alternatively, if custodian system 130 were to validate the received application-specific credential based on the consensus output data (step 610; YES), custodian system 130 may validate the request and grant third-party application 106 access to the requested elements of confidential data.

Referring back to FIG. 6, and responsive to a grant of access to third-party application by custodian system 130 (e.g., step 610; YES), custodian system 130 may parse the now-validated request to extract the identifiers of the requested elements of confidential data (e.g., in step 612), and may perform operations that extract, from an accessible data repository, such as confidential data store 136 of FIG. 1, each of the requested elements of confidential data based on the identifiers (e.g., in step 614).

Custodian system 130 may encrypt the extracted elements of confidential data using a public cryptographic key associated with or assigned to third-party application 106 and in some instances, may apply a digital signature to the encrypted elements of confidential data using any appropriate digital signature algorithm in conjunction with a private cryptographic key of custodian system 130 (e.g., in step 616). Custodian system 130 may transmit the encrypted and digitally signed elements of confidential data across network 120 to client device 102 (e.g., in step 618). Exemplary process 600 is then complete in step 608.

Figure 7:
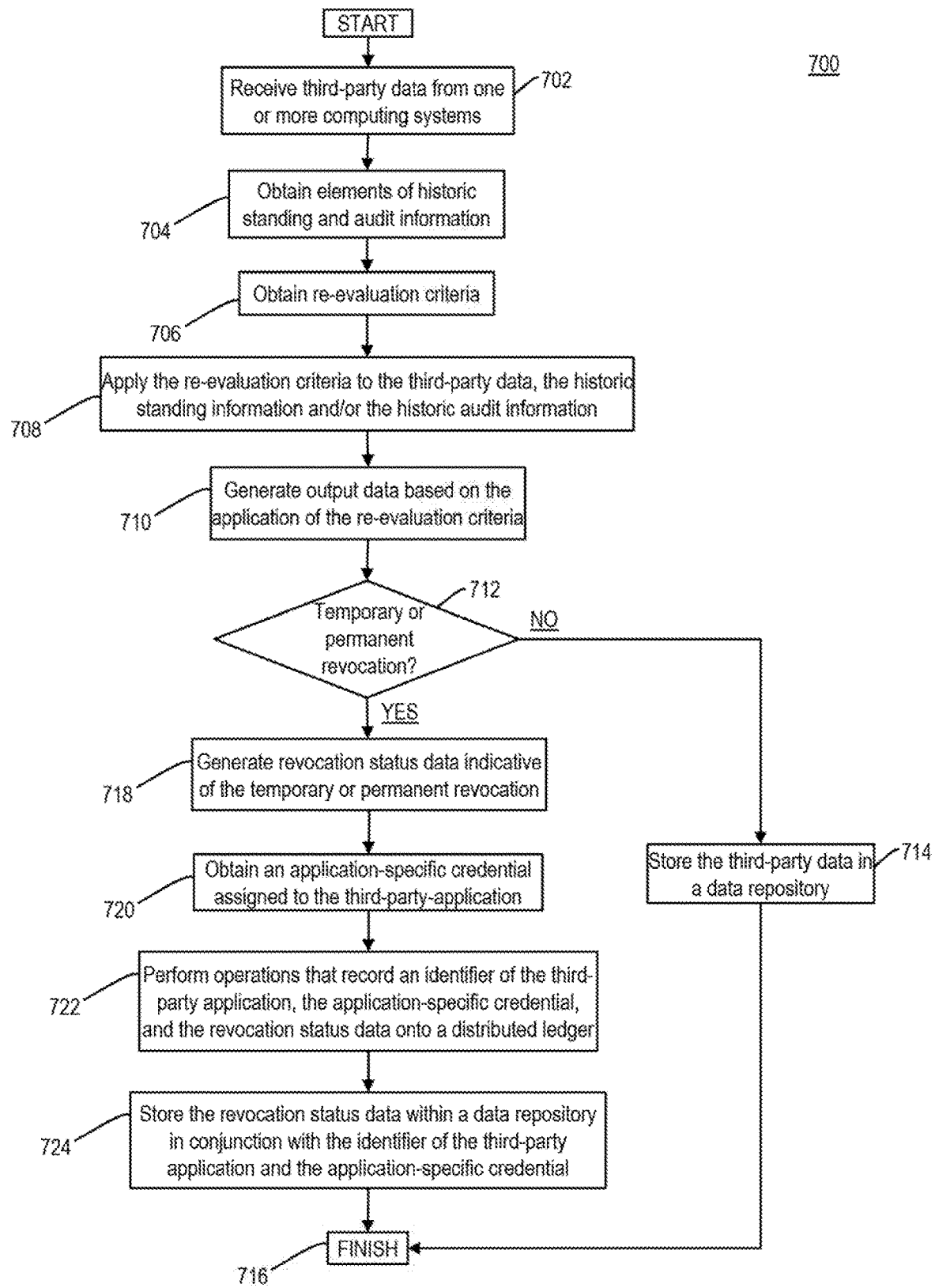

FIG. 7 is a flowchart of an exemplary process 700 for dynamically managing trust, consent, and permissioning between computing systems and unrelated third-party applications within a computing environment, in accordance with disclosed exemplary embodiments. In some instances, one or more computing systems associated or operated by centralized authority, such as CA system 150 of FIG. 1, may perform one or more steps of exemplary process 500, which, among other things, may dynamically revoke, on a permanent or temporary basis, an application-specific credential issued previously to a third-party application, such as third-party application 106 of FIG. 1, based on audit information indicative of a subsequent use, management, or distribution of confidential data by third-party application 106, or based on detected change in judicial, governmental, or regulatory stating of a third-party entity associated with third-party application 106.

Referring to FIG. 7, CA system 150 may receive third-party data from one or more computing systems (e.g., in step 702). The received third-party data may include any of the exemplary elements of standing or audit information described herein, which not only characterize third-party application 106, but also characterize the third-party entity associated with third-party application 106. Further, the received third-party data may also include an identifier of third-party application 106 (e.g., an application cryptogram, etc.) or an identifier of the third-party entity (e.g., an entity names).

Based on the identifiers of third-party application 106 and/or the third-party entity, CA system 150 may access a locally maintained data repository, e.g., data repository 152 of FIG. 1, and extract any of the elements of historic standing information and historic audit information described herein, which characterizing respective ones of a standing or audit status of the third-party entity, a third-party system associated with the third-party entity (e.g., third-party system 180 of FIG. 1), and/or third-party application 106 over one or more prior temporal intervals (e.g., in step 704). Further, in step 706, CA system 150 may obtain data identifying and characterizing one or more of the exemplary re-evaluation criteria described herein, such as from a locally maintained copy of a distributed ledger (e.g., from criteria ledger blocks 174 of distributed ledger 170 of FIG. 1) or from data repository 152 (e.g., from credential data store 156 of FIG. 1).

In some examples, CA system 150 may perform any of the exemplary processes described herein to establish an applicability of each of the re-evaluation criteria to discrete portions of the third-party data, either alone or in conjunction with elements of the historic standing information and the historic audit information 414 (e.g., in step 708). CA system 150 may also generate one or more elements of output data for each of the re-evaluation criteria that specifies an applicability, or alternatively, an inapplicability, the corresponding one of the re-evaluation criteria to the third-party data, either alone or in conjunction with elements of the historic standing information or the historic audit information (e.g., in step 710). For example, each of the elements of the output data may include a binary flag, the value of which may indicate the determined applicability (e.g., a value of unity) or determined inapplicability (e.g., a value of zero). The elements of output data may also include data identifying corresponding ones of the re-evaluation criteria, and in some instances, for a determined applicability, additional data that specifies a source of the determined applicability (e.g., a lapsed incorporation, at least the threshold number of detected misuses, etc.).

Based on the generated output data, CA system 150 may perform any of the exemplary processes described herein to determine whether the application of the re-evaluation criteria to the elements of the third-party data, the historic standing information, and/or the historic audit information triggers a revocation of the application-specific credential associated with third-party application 106, either on a temporary or a permanent basis (e.g., in step 712). If, for example, CA system 150 were to determine that the application of the re-evaluation criteria fails to trigger either a permanent or temporary revocation of the application-specific credential associated with third-party application 106 (step 712; NO), CA system 150 may perform operations that store the third-party data within a corresponding portion of data repository 152 in conjunction with the identifier of third-party application 106 (e.g., in step 714). Exemplary process 700 is then complete in step 716.

Alternatively, if CA system 150 were to determine that the application of the re-evaluation criteria triggers either a permanent or temporary revocation of the application-specific credential associated with third-party application 106 (step 712; YES), CA system 150 may perform operations that generate one or more elements of revocation status data that indicate the triggered revocation, such as a data flag having a value indicative of the permanent or temporary revocation (e.g., in step 718). Further, and for a temporary revocation, the revocation status data may also include temporal data specifying a duration of that temporary revocation.

In step 720, CA system 150 may also obtain the access-specific credential assigned to third-party application 106 from credential ledger blocks 176 of distributed ledger 170 (e.g., as locally maintained within data repository 152) or from a locally maintained data repository (e.g., from credential data store 156 of data repository 152). CA system 150 may also perform any of the exemplary, consensus-based processes described herein (e.g., individually, or in conjunction with the other CA systems operating within environment 100) to record the identifier of third-party application 106, the obtained application-specific credential, and the generated revocation status data within one or more ledger blocks of a cryptographically secure distributed ledger, which may be accessible to custodian system 110, custodian system 130, and the other custodian systems operating within environment 100 (e.g., in step 722).

In some instances, in step 724, CA system 150 may perform operations that store the revocation status data within credential data store 156 in conjunction with the application-specific credential of third-party application 106 and the identifier of third-party application 106, e.g., to specify the permanent or temporary revocation. In other instances, and based on a triggered permanent revocation of the application-specific credential of third-party application 106, revocation module 424 may perform further operations that delete the application-specific credential of third-party application 106 from credential data store 156 (e.g., also in step 726). Exemplary process 700 is then complete in step 718.

III. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, such as, but not limited to, third-party application 106, on-boarding engines 121 and 141, consent and permissioning engines 141 and 142, centralized on-boarding engine 158, re-evaluation engine 160, access management module 210, APIs 220, 316, 348, and 404, management module 222, consistency module 224, trust determination module 232, credential generation module 238, recordation engine 248, block generation module 250, distributed consensus module 262, request management module 302, validation module 320, consent verification module 322, trust verification module 326, provisioning module 336, local validation module 350, data processing module 352, operations module 354, consistency module 406, triggering module 420, and revocation module 424, can be implemented as one or more computer programs, i.e., one or more modules of computer program instructions encoded on a tangible non-transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
   a communications interface;
   a memory storing instructions; and
   at least one processor coupled to the communications interface and the memory, the at least one processor being configured to execute the instructions to:
      receive, from a device via the communications interface, a first request for an element of data, the first request comprising an application identifier and first credential data associated with an application program executed by the device;
      based on the application identifier, obtain second credential data associated with the application program from one or more blocks of a distributed ledger, and when the first credential data corresponds to the second credential data, determine that the data element is accessible to the application program; and
      obtain and encrypt the data element, and transmit the encrypted data element to the device via the communications interface.

2. The apparatus of claim 1, wherein:
   the first request further comprises an access token; and
   the at least one processor is further configured to execute the instructions to:
      determine that the first credential data corresponds to the second credential data;
      perform operations that validate the access token; and
      based on the determination that the first credential data corresponds to the second credential data, and based on the validation of the access token, obtain and encrypt the data element.

3. The apparatus of claim 2, wherein the at least one processor is further configured to execute the instructions to:
   obtain a reference access token associated with the application program from a portion of the memory;
   extract the access token from the first request, and determine that the reference access token corresponds to the access token; and
   validate the access token based on the determination that the reference access token corresponds to the access token.

4. The apparatus of claim 1, wherein the at least one processor is further configured to execute the instructions to load the one or more blocks of the distributed ledger from a portion of the memory.

5. The apparatus of claim 1, wherein the at least one processor is further configured to execute the instructions to:
   obtain, from the one or more ledger blocks of the distributed ledger, revocation data associated with the application identifier;
   based on the revocation data, determine that the second credential data is subject to a permanent revocation or a temporary revocation;
   based on the determination that the second credential data is subject to the permanent or temporary revocation, determine that the data element is inaccessible to the application program;
   generate an error message indicative of the permanent or temporary revocation of the second credential data; and
   transmit the error message to the device via the communications interface.

6. The apparatus of claim 1, wherein the at least one processor is further configured to execute the instructions to:
   transmit, to a computing system via the communications interface, a second request that includes the application identifier and the first credential data, the second request causing the computing system to execute additional instructions included within a first ledger block of the distributed ledger, the executed additional instructions further causing the computing system to obtain the second credential data from a second ledger block of the distributed ledger based on the application identifier and to determine that the first credential data corresponds to the second credential data;
   receive, via the communications interface, a response to the second request from the computing system, the response being indicative of the determination that the first credential data corresponds to the second credential data; and
   determine that the data element is accessible to the application program based on the response.

7. The apparatus of claim 1, wherein the at least one processor is further configured to execute the instructions to:
   determine that the data element is inaccessible to the application program when the first credential data fails to correspond to second credential data;
   generate an error message indicative of the inaccessibility of the data element to the application program; and
   transmit the error message to the device via the communications interface.

8. The apparatus of claim 1, wherein the at least one processor is further configured to execute the instructions to:
   load a public cryptographic key of the application program from the memory; and
   encrypt the data element using the public cryptographic key.

9. The apparatus of claim 1, wherein an additional processor of the device executes the application program, and the executed application program causes the device to generate the first request.

10. A computer-implemented method, comprising:
    receiving, using at least one processor, a first request for an element of data from a device, the first request comprising an application identifier and first credential data associated with an application program executed by the device;
    based on the application identifier, obtaining, using the at least one processor, second credential data associated with the application program from one or more blocks of a distributed ledger, and when the first credential data corresponds to the second credential data, determining, using the at least one processor, that the data element is accessible to the application program; and
    using the at least one processor, obtaining and encrypting the data element, and transmitting the encrypted data element to the device.

11. The computer-implemented method of claim 10, wherein the first request further comprises an access token, the method further comprising:
    using the at least one processor, determining that the first credential data corresponds to the second credential data;
    using the at least one processor, performing operations that validate the access token; and using the at least one processor, obtaining and encrypting the data element based on the determination that the first credential data corresponds to the second credential data, and based on the validation of the access token.

12. An apparatus, comprising:
a communications interface;
a memory storing instructions; and
at least one processor coupled to the communications interface and the memory, the at least one processor being configured to execute the instructions to:
obtain a first request for an element of data, the first request comprising first credential data associated with an application program executed by a device;
transmit, via the communications interface, a second request for second credential data associated with the application program to a computing system, the computing system being configured to obtain the second credential data from one or more ledger blocks of a distributed ledger based on the second request;
receive, via the communications interface, a response to the second request from the computing system;
based on the response, determine that the first credential data corresponds to the second credential data, and that the data element is accessible to the application program; and
obtain and encrypt the data element, and transmit the encrypted data element to the device via the communications interface.

13. The apparatus of claim 12, wherein the at least one processor is further configured to execute the instructions to receive the first request from the device.

14. The apparatus of claim 13, wherein:
the first request further comprises an access token; and
the at least one processor is further configured to execute the instructions to:
perform operations that validate the access token; and
based on the determination that the first credential data corresponds to the second credential data, and based on the validation of the access token, obtain and encrypt the data element.

15. The apparatus of claim 12, wherein the computing system further configured to execute additional instructions included within a first ledger block of the distributed ledger, the executed additional instructions causing the computing system to obtain the second credential data from a second ledger block of the distributed ledger based on the second request, and to determine that the first credential data corresponds to the second credential data.

16. The apparatus of claim 12, wherein the first request further comprises an application identifier associated with the application program, and the second request comprises the application identifier.

17. The apparatus of claim 16, wherein the second request further causes the computing system to obtain the second credential data from the one or more ledger blocks of the distributed ledger based on the application identifier.

18. The apparatus of claim 16, wherein:
the computing system is further configured to obtain, from the one or more ledger blocks of the distributed ledger, revocation data associated with the application identifier;
the response includes the revocation data; and
the at least one processor is further configured to execute the instructions to:
determine that the second credential data is subject to a permanent revocation or a temporary revocation based on the revocation data;
based on the determination that the second credential data is subject to the permanent or temporary revocation, determine that the data element is inaccessible to the application program;
generate an error message indicative of the permanent or temporary revocation of the second credential data; and
transmit the error message to the device via the communications interface.

19. The apparatus of claim 12, wherein the at least one processor is further configured to execute the instructions to:
determine that the data element is inaccessible to the application program based on the additional response based on the response;
generate an error message indicative of the inaccessibility of the data element to the application program; and
transmit the error message to the device via the communications interface.

20. The apparatus of claim 12, wherein the at least one processor is further configured to execute the instructions to:
load a public cryptographic key of the application program from the memory; and
encrypt the data element using the public cryptographic key.

* * * * *